(12) United States Patent
Nyquist

(10) Patent No.: US 6,634,134 B1
(45) Date of Patent: Oct. 21, 2003

(54) SMART ROD HOLDER

(76) Inventor: Thomas P. Nyquist, 2311 Springcreek Dr., Bozeman, MT (US) 59715

( * ) Notice: Subject to any disclaimer, the term of this patent is extended or adjusted under 35 U.S.C. 154(b) by 0 days.

(21) Appl. No.: 09/970,494

(22) Filed: Oct. 2, 2001

Related U.S. Application Data

(60) Provisional application No. 60/237,663, filed on Oct. 3, 2000.

(51) Int. Cl.$^7$ ................................................ A01K 97/10
(52) U.S. Cl. ........................ 43/19.2; 43/21.2; 43/26.1; 43/16
(58) Field of Search ................................ 43/19.2, 26.1, 43/21.2, 15, 16; 248/511, 523, 529

(56) References Cited

U.S. PATENT DOCUMENTS

| | | | |
|---|---|---|---|
| 2,144,876 A | * 1/1939 | Garnett | 43/21.2 |
| 2,211,278 A | * 8/1940 | Le Febvre | 43/21.2 |
| 2,704,412 A | * 3/1955 | Davis | 43/21.2 |
| 2,758,407 A | 8/1956 | Speidell | |
| 3,001,317 A | 9/1961 | Boughton | |
| 3,031,790 A | 5/1962 | Durvea | |
| 3,550,302 A | 12/1970 | Creviston et al. | |
| 3,568,352 A | 3/1971 | Hill | |
| 3,623,259 A | 11/1971 | Rode | |
| 3,665,633 A | 5/1972 | Scott | |
| 3,691,668 A | 9/1972 | Strebig | |
| 3,792,829 A | * 2/1974 | Fickett | 43/21.2 |
| 3,839,810 A | 10/1974 | Lagasse | |
| 3,910,524 A | 10/1975 | Ireland | |
| 4,081,922 A | 4/1978 | Johnson | |
| 4,100,695 A | 7/1978 | Blanchard | |
| 4,120,112 A | 10/1978 | McBain | |
| 4,197,668 A | 4/1980 | McKinsey | |
| 4,251,939 A | 2/1981 | Tiede | |
| 4,280,295 A | 7/1981 | Hoeving et al. | |
| 4,373,287 A | 2/1983 | Grahl | |
| 4,376,350 A | 3/1983 | Bednarz et al. | |
| 4,384,427 A | * 5/1983 | Christiansen | 43/26.1 |
| 4,407,089 A | * 10/1983 | Miller | 43/21.2 |
| 4,597,215 A | 7/1986 | Otremba | |
| 4,603,499 A | 8/1986 | Simborski | |
| 4,627,186 A | 12/1986 | Wang | |
| 4,635,390 A | * 1/1987 | Walters | 43/21.2 |
| 4,642,930 A | 2/1987 | Graf | |
| 4,660,317 A | 4/1987 | Evans | |
| 4,676,019 A | * 6/1987 | Engles | 43/21.2 |
| 4,680,885 A | 7/1987 | Lindell et al. | |
| 4,779,371 A | 10/1988 | Braud | |
| 4,793,088 A | 12/1988 | Fortuna | |
| 4,916,847 A | 4/1990 | Rusgo | |
| 4,932,151 A | 6/1990 | Cicha | |
| 4,951,411 A | 8/1990 | Ecker | |
| 4,974,358 A | 12/1990 | King et al. | |
| 5,036,616 A | 8/1991 | Wilsey | |
| 5,056,255 A | 10/1991 | Campbell | |
| 5,084,995 A | 2/1992 | Beaudoin | |
| 5,119,580 A | 6/1992 | Schulte et al. | |
| 5,313,734 A | * 5/1994 | Roberts | 43/21.2 |
| 5,367,815 A | * 11/1994 | Liou | 43/21.2 |
| 5,437,121 A | 8/1995 | Chacon, Jr. et al. | |
| 5,446,989 A | * 9/1995 | Stange et al. | 43/21.2 |
| 5,460,306 A | * 10/1995 | Rudd | 43/21.2 |
| 5,461,817 A | * 10/1995 | Flood | 43/19.2 |
| 5,540,010 A | 7/1996 | Aragona | |
| 5,570,534 A | 11/1996 | Ford | |
| 6,009,656 A | 1/2000 | Knepp | |

FOREIGN PATENT DOCUMENTS

GB 1025415 4/1966

* cited by examiner

*Primary Examiner*—Darren W. Ark
(74) *Attorney, Agent, or Firm*—Robert M. Hunter

(57) ABSTRACT

An apparatus and method for automated movement of a fishing rod. A preferred embodiment comprises a quick-release receptacle for a fishing rod, a drive mechanism, means for connecting the receptacle to the drive mechanism, a programmable controller, an input/output device and a mounting bracket. Preferred methods support a wide range of fishing rod movements, including erratic movements that increase fishing success. Operational modes include fishing (both trolling and jigging), setting a hook and playing a fish.

31 Claims, 19 Drawing Sheets

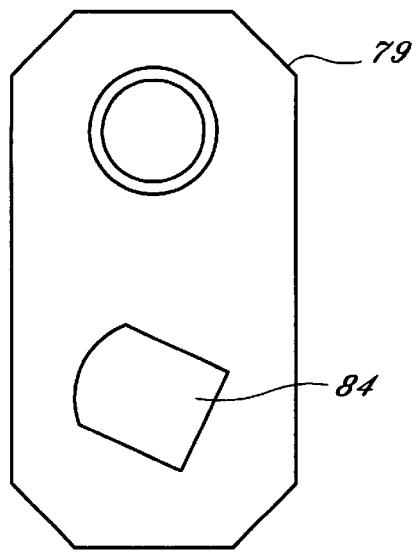
Fig. 9
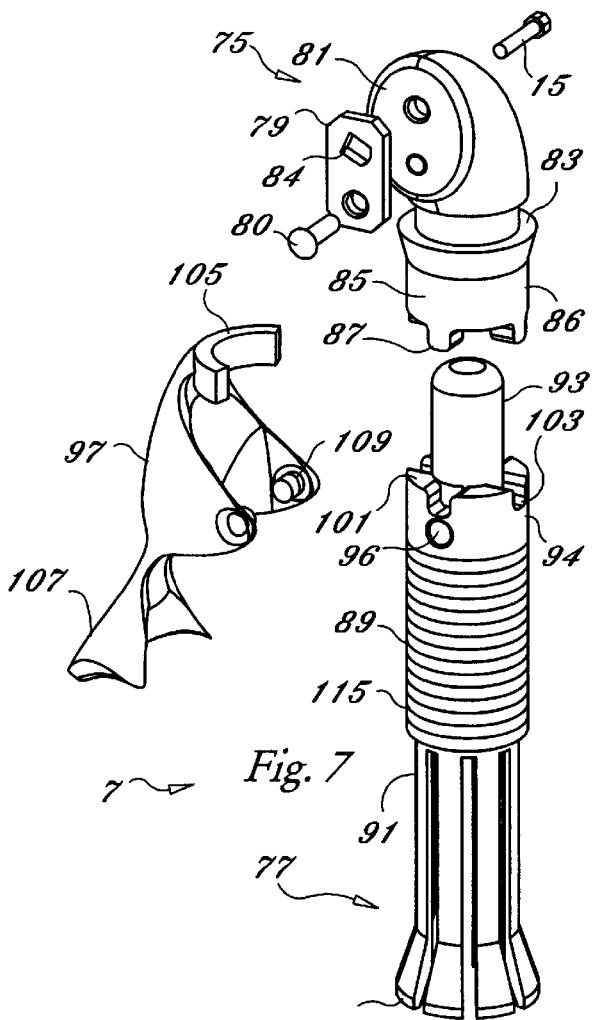
Fig. 7
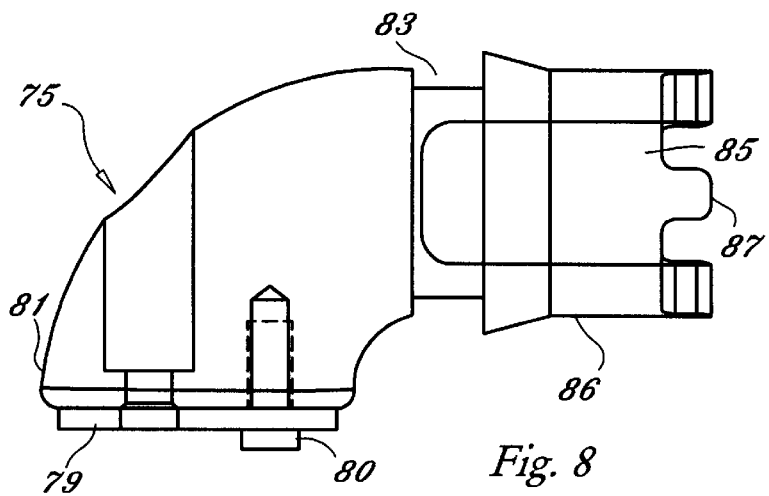
Fig. 8

| INITIALIZING | *Fig. 14* 32 |

| CLOCK WISE 32 | *Fig. 15A* |

| COUNTER CLOCK | *Fig. 15B* 32 |

| 6 FEET 32 | *Fig. 16A* |

| 7 FEET | *Fig. 16B* 32 |

| 8 FEET 32 | *Fig. 16C* |

| 9 FEET | *Fig. 16D* 32 |

| 10 FEET | *Fig. 16E* 32 |

| 0 MPH JIGGING 32 | *Fig. 17A* |

| 1 MPH TROLLING | *Fig. 17B* 32 |

| 9 MPH TROLLING 32 | *Fig. 17C* |

| DEGREE MOVEMENT | *Fig. 18A* |
| FEET MOVEMENT | *Fig. 18B* |
| BACKPRESS MOVEMENT | *Fig. 18C* |
| RANDOM MOVEMENT | *Fig. 18D* |

| BACK FAST | *Fig. 20A* |
| BACK MEDIUM | *Fig. 20B* |
| BACK SLOW | *Fig. 20C* |
| BACK PROGRAM | *Fig. 20D* |

| PROGRAM 0 | *Fig. 19A* |
| PROGRAM 9 | *Fig. 19B* |

SMART ROD HOLDER

CROSS-REFERENCE TO RELATED APPLICATIONS

This application claims the benefit of U.S. Provisional Application No. 60/237,663, filed Oct. 3, 2000, the disclosure of which application is incorporated by reference as if fully set forth herein.

STATEMENT REGARDING FEDERALLY SPONSORED RESEARCH OR DEVELOPMENT

Not Applicable

BACKGROUND OF THE INVENTION

This invention relates to a fishing apparatus and method. In particular, the invention relates to a programmable holder for a fishing rod and methods for using the same.

The background art is characterized by a variety of issued patents, including U.S. Pat. Nos. 2,758,407; 3,001,317; 3,031,790; 3,550,302; 3,568,352; 3,623,259; 3,665,633; 3,691,668; 3,839,810; 3,910,524; 4,081,922; 4,100,695; 4,120,112; 4,197,668; 4,251,939; 4,280,295; 4,373,287; 4,376,350; 4,597,215; 4,603,499; 4,627,186; 4,642,930; 4,660,317; 4,680,885; 4,779,371; 4,793,088; 4,916,847; 4,932,151; 4,951,411; 4,974,358; 5,036,616; 5,084,995; 5,056,255; 5,119,580; 5,437,121; 5,540,010; 5,570,534; 6,009,656; the disclosures of which are incorporated by reference as if fully set forth herein; and by United Kingdom Patent No. 1,025,415.

As is made clear by the summary description presented below of the inventions disclosed in the above references, none of the inventions in the background art solves the problems that are solved by the present invention. Limitations in the structure and function of the inventions in the background art prevent those devices from causing a fishing lure or bait to move in an erratic, natural manner. Moreover, those inventions lack other features of the present invention.

Speidell in U.S. Pat. No. 2,758,407 discloses a fishing apparatus. This invention is limited in that it relies on a rotating cam-type design to impart a regular, oscillating, up-and-down motion ("steady reciprocation") to the tip of a fishing rod. The invention is further limited in that modifying the cam is necessary to affect a change in the jigging motion and in that means are not provided to secure the fishing rod in the device. Moreover, during trolling, rapid movement of the rod tip in the direction opposite that of the motion of the boat is not possible because of the disclosed shape of the cam. Neither are means provided for detecting a nibble or for setting a hook.

Boughton in U.S. Pat. No. 3,001,317 discloses a vibrating fishing pole support. This invention is limited in that it relies on a solenoid-type design to impart a regular, oscillating, up-and-down motion that "vibrates or oscillates" the tip of a fishing rod. The invention is further limited in that means are not provided to secure the fishing rod in the device. Moreover, during trolling, rapid movement of the rod tip in the direction opposite that of the motion of the boat is not possible. Neither are means provided for detecting a nibble or for setting a hook.

Duryea in U.S. Pat. No. 3,031,790 discloses a fishing jig. This invention is limited in that it relies on a rotating eccentric-type design to impart a regular, oscillating, up-and-down motion to a fishing line. The invention is further limited in that changing the effective length of a crank arm is necessary to affect a change in magnitude of the jigging motion and in that means are not provided to secure the fishing rod in the device. Moreover, during trolling, rapid movement of the rod tip in the direction opposite that of the motion of the boat is not possible. Neither are means provided for detecting a nibble or for setting a hook.

Crevison et al. in U.S. Pat. No. 3,550,302 discloses a device for imparting a periodic jerking movement to a fishing line that has an alarm mechanism for alerting the fisherman to the bite of a fish. This invention is limited in that it relies on a rotating cam-type design to impart a periodic, "jerking," up-and-down motion to a fishing line. The invention is further limited in that it is not possible to change the magnitude of the jigging motion and in that the line and not the fishing rod is moved by the device. Moreover, during trolling, rapid movement of the rod tip in the direction opposite that of the motion of the boat is not possible because of the shape of the cam.

Hill in U.S. Pat. No. 3,568,352 discloses a device for automatically playing one or more fishing lines. This invention is limited in that it relies on a rotating cam-type design to impart a periodic, up-and-down motion to a fishing line. The invention is further limited in that it is not possible to change the magnitude of the jigging motion and in that the line and not the fishing rod is moved by the device. Neither are means provided for setting a hook.

Rode in U.S. Pat. No. 3,623,259 discloses a fishing rod agitator. This invention is limited in that it relies on a rotating cam-type design to impart a regular, oscillating, up-and-down motion to the tip of a fishing rod. The invention is further limited in that it is not possible to change the magnitude of the jigging motion. Moreover, during trolling, rapid movement of the rod tip in the direction opposite that of the motion of the boat is not possible because of the shape of the cam. Neither are means provided for detecting a nibble or for setting a hook.

Scott in U.S. Pat. No. 3,665,633 discloses a fishing apparatus. This invention is limited in that it relies on a cam- or eccentric-type design to impart a regular, oscillating, side-to-side ("cyclic") motion to the tip of a pair of fishing rods. The invention is further limited in that it is not possible to change the magnitude of the oscillating motion. Moreover, during trolling, rapid movement of the rod tip in the direction opposite that of the motion of the boat is not possible because of the shape of the cam. Neither are means provided for detecting a nibble or for setting a hook.

Strebig in U.S. Pat. No. 3,691,668 discloses an automatic electric jig-fishing device. This invention is limited in that it relies on a solenoid-type design to impart an oscillating, up-and-down motion to the tip of a specially-designed fishing rod. The invention is further limited in that very limited rod tip movement is affected by the device and in that means are not provided to secure the fishing rod in the device. Moreover, the device cannot be used during trolling. Neither are means provided for detecting a nibble or for setting a hook.

Lagasse in U.S. Pat. No. 3,839,810 discloses an automatic fishing rod motion control device. This invention is limited in that it relies on a rotating eccentric-type design to impart a regular, oscillating, side-to-side ("back and forth") motion to the tip of a fishing rod. The invention is further limited in that reconfiguring the eccentric is necessary to change the magnitude of the jigging motion. The only variations in rod tip motion that are possible with this device are to introduce a jerk on the forward stroke and to introduce a pause at the end of every forward and backward motion of the rod. Neither are means provided for setting a hook.

Ireland in U.S. Pat. No. 3,910,524 discloses a downrigger device for fishing. The invention is limited in that it is only capable of lowering and raising a weight attached to the end of a fishing line.

Johnson in U.S. Pat. No. 4,081,922 discloses a double fish pole jigger. This invention is limited in that it relies on a rotating cam-type design to impart a regular, oscillating, up-and-down motion to the tips of a pair of jig arms. The invention is further limited in that it is not possible to change the magnitude of the jigging and the device cannot be used in trolling. Neither are means provided for detecting a nibble or for setting a hook.

Blanchard in U.S. Pat. No. 4,100,695 discloses a fishing rod jigging apparatus. This invention is limited in that it relies on a design that comprises a modified windshield wiper motor to impart a regular, oscillating, fore-and-aft motion to the tip of a fishing rod. The invention is further limited in that it is not possible to change the magnitude of the jigging motion. Moreover, during trolling, rapid movement of the rod tip in the direction opposite that of the motion of the boat is not possible because of the configuration of the drive mechanism. Neither are means provided for detecting a nibble or for setting a hook.

McBain in U.S. Pat. No. 4,120,112 discloses an apparatus for agitating a fishing line. This invention is limited in that it relies on a rotating cam-type design to impart a regular, "repetitive," oscillating, up-and-down and side-to-side motion to a lure or bait attached to a fishing line. The invention is further limited in that means are not provided to secure the fishing rod in the device. Moreover, during trolling, rapid movement of the rod tip in the direction opposite that of the motion of the boat is not possible because of the shape of the cams. Neither are means provided for detecting a nibble or for setting a hook.

McKinsey in U.S. Pat. No. 4,197,668 discloses a holder for a fishing rod. This invention is limited in that it,relies on a rotating spring and solenoid-type design to automatically shift the tip of a fishing rod upwardly when a fish bites. The invention is further limited in that it is not possible to change the magnitude of the upward motion. Moreover, during trolling, rapid movement of the rod tip in the direction opposite that of the motion of the boat is not possible.

Tiede in U.S. Pat. No. 4,252,939 discloses a "programmable" fish line jiggler. This invention is limited in that it relies on a rotating wheel-type design to impart a regular, oscillating, up-and-down motion to the tip of a fishing rod. The invention is further limited in that reconfiguring the wheel is necessary to affect a change in magnitude of the jigging motion. Moreover, during trolling, rapid movement of the rod tip in the direction opposite that of the motion of the boat is not possible. Neither are means provided for detecting a nibble or for setting a hook.

Hoeving et al. in U.S. Pat. No. 4,280,295 disclose an apparatus for providing movement to a fishing line. This invention is limited in that it relies on a rotating cam-type design to impart a regular, oscillating, up-and-down motion ("slow upward movement followed by a fast sinking movement") to a fishing line. The invention is further limited in that reconfiguring the wheel is necessary to affect a change in magnitude of the jigging motion. Neither are means provided for detecting a nibble or for setting a hook.

Grahl in U.S. Pat. No. 4,373,287 discloses an ice fishing apparatus. This invention is limited in that it relies on a wind-powered mechanism to impart a regular, oscillating, up-and-down motion to the tip of a fishing rod. The invention is further limited in that the magnitude of the jigging motion is a function of the wind speed. Neither are means provided for setting a hook.

Bednarz et al. in U.S. Pat. No. 4,376,350 disclose an automatic downrigger control system. The invention is limited in that it is only capable of automatically lowering and raising a weight attached to the end of a fishing line.

Otremba in U.S. Pat. No. 4,597,215 discloses a powered jigging device. This invention is limited in that it relies on a rotating cam driven by an automotive windshield wiper motor to impart a regular, oscillating, up-and-down motion to the tip of a fishing rod. Neither are means provided for detecting a nibble or for setting a hook.

Simborski in U.S. Pat. No. 4,603,499 discloses a horizontal fishing rod motion control device for use in trolling. This invention is limited in that it relies on a slider crank mechanism to impart a regular, oscillating, back and forth motion to the tip of a fishing rod. The invention is further limited in that reconfiguring the cam is necessary to affect a change in magnitude of the back and forth motion of the rod tip. Moreover, during trolling, rapid movement of the rod tip in the direction opposite that of the motion of the boat is not possible because of the shape of the cam. Neither are means provided for detecting a nibble or for setting a hook.

Wang in U.S. Pat. No. 4,627,186 discloses an automatic fishing machine. The invention is limited in that it only provides means for detecting a nibble and for setting a hook and does not support jigging or trolling.

Graf in U.S. Pat. No. 4,642,930 discloses a fishing apparatus for automatically bobbing a bait and signaling a catch. This invention is limited in that it relies on a pendulum arrangement to impart a regular, oscillating, up-and-down motion to a fishing line. Moreover, during trolling, rapid movement of the rod tip in the direction opposite that of the motion of the boat is not possible. Neither are means provided for detecting a nibble.

Evans in U.S. Pat. No. 4,660,317 discloses an apparatus for supporting and agitating a fishing rod. This invention is limited in that it relies on motor driving circuitry having an H-bridge configuration to impart a regular, oscillating, up-and-down motion to the tip of a fishing rod. The invention is further limited in that reconfiguring the drive mechanism ("adjusting a locking screw, not shown") is necessary to vary the starting and finishing positions of the fishing rod stroke. Moreover, during trolling, rapid movement of the rod tip in the direction opposite that of the motion of the boat is not possible. Neither are means provided for setting a hook.

Lindell et al. in U.S. Pat. No. 4,680,885 disclose a fish "jiggling" device. This invention is limited in that it relies on a stepping motor-type design to impart a regular, "constant," oscillating, up-and-down motion to a lure or bait that is attached to a fishing line. The invention is further limited in that detection of a nibble requires that the fishing line be pulled by a force sufficient to "overcome the stepper motor torque" and in that detection of a nibble causes the output shaft of the device to "freewheel." Neither are means provided for setting a hook.

Braud in U.S. Pat. No. 4,779,371 discloses an ice fishing device. This invention is limited in that it relies on a rotating cam-type design to impart a regular, oscillating, up-and-down motion to the tip of a fishing rod. The invention is further limited in that means are not provided to secure the fishing rod in the device. Moreover, the device is not applicable to trolling, in that rapid movement of the rod tip in the direction opposite that of the motion of the boat is not possible because of the configuration of the cam. Neither are means provided for detecting a nibble.

Fortuna in U.S. Pat. No. 4,793,088 discloses a multiple remote-controlled downrigger and planing board system. This invention is not applicable to jigging and can only be used to vary the depth of trolling.

Rusgo in U.S. Pat. No. 4,916,847 discloses a jigging device. This invention is limited in that it relies on a rotating eccentric driven by an automobile windshield wiper motor to impart a regular, oscillating, up-and-down motion to the tip of a fishing rod. Operation of the motor is not computer controlled. Neither are means provided for detecting a nibble or for setting a hook.

Cicha in U.S. Pat. No. 4,932,151 discloses a rod jigging apparatus. This invention is limited in that it relies on a rotating crank arm-type design to impart an oscillating, up-and-down motion to the tip of a fishing rod. The invention is further limited in that the motion of the rod tip is limited to 90 degrees from the horizon and in that means are not provided to secure the fishing rod in the device. Moreover, the device cannot be used during trolling. Neither are means provided for detecting a nibble or for setting a hook.

Ecker in U.S. Pat. No. 4,951,411 discloses an electrically operated fishing jigger. This invention is limited in that it relies on a rotating cam-type design to impart a regular, oscillating, up-and-down motion to the tip of a fishing rod. The invention is further limited in that changing the cam is necessary to affect a change in magnitude of the jigging motion. Moreover, during trolling, rapid movement of the rod tip in the direction opposite that of the motion of the boat is not possible because of the shape of the cam. Neither are means provided for detecting a nibble or for setting a hook.

King et al. in U.S. Pat. No. 4,974,358 discloses a cycle control for an electric downrigger. This invention is limited in that it relies on a winch-type design to impart an oscillating, up-and-down motion to a downrigger weight or cannonball behind which a lure is trailed during trolling. The invention is further limited in that the motion of the weight is limited to up and down motion. Neither are means provided for detecting a nibble or for setting a hook.

Wilsey in U.S. Pat. No. 5,036,616 discloses a fish bait jigger. This invention is limited in that it relies on a rotating eccentric roller-type design to impart a regular, oscillating, up-and-down motion to a fishing line. The invention is further limited in that reconfiguring the eccentric roller is necessary to affect a change in the magnitude of the jigging. Moreover, during trolling, rapid movement of the rod tip in the direction opposite that of the motion of the boat is not possible. Neither are means provided for detecting a nibble or for setting a hook.

Campbell in U.S. Pat. No. 5,056,255 discloses a fishing rod jigging apparatus. This invention is limited in that it relies on a rotating cam-type design to impart a regular, oscillating, up-and-down motion to the tip of a fishing rod. Moreover, during trolling, rapid movement of the rod tip in the direction opposite that of the motion of the boat is not possible because of the shape of the cam.

Beaudion in U.S. Pat. No. 5,084,995 discloses a jigging apparatus. This invention is limited in that it relies on a rotating cam-type design to impart a regular, oscillating, up-and-down motion to the tip of a fishing rod. The invention is further limited in that it is not possible to change the magnitude of the jigging motion. Moreover, during trolling, rapid movement of the rod tip in the direction opposite that of the motion of the boat is not possible because of the elliptical shape of the cam. Neither are means provided for detecting a nibble or for setting a hook.

Schulte et al. in U.S. Pat. No. 5,119,580 disclose a device for jigging a fishing pole. This invention is limited in that it relies on a rotating cam-type design to impart a regular, oscillating, up-and-down motion to the tip of a fishing rod. The invention is further limited in that changing the cam is necessary to affect a change in magnitude of the jigging motion. Moreover, during trolling, rapid movement of the rod tip in the direction opposite that of the motion of the boat is not possible because of the shape of the cam. Neither are means provided for detecting a nibble or for setting a hook.

Chacon, Jr. et al. in U.S. Pat. No. 5,437,121 disclose a device for supporting a fishing rod and for providing a periodic lifting motion to the rod to effect jigging. This invention is limited in that it relies on a rotating cam-type design to impart a regular, oscillating, up-and-down motion to the tip of a fishing rod. The invention is further limited in that it is not possible to change the magnitude of the jigging motion and in that means are not provided to secure the fishing rod in the device. Moreover, during trolling, rapid movement of the rod tip in the direction opposite that of the motion of the boat is not possible because of the shape of the cam. Neither are means provided for detecting a nibble or for setting a hook.

Aragona in U.S. Pat. No. 5,540,010 discloses a fishing rod jigging apparatus. This invention is limited in that it relies on a rotating eccentric-type design to impart a regular, oscillating, up-and-down motion to the tip of a fishing rod. The invention is further limited in that it is not possible to change the magnitude of the jigging motion and in that means are not provided to secure the fishing rod in the device. Moreover, during trolling, rapid movement of the rod tip in the direction opposite that of the motion of the boat is not possible because of the circular configuration of the eccentric. Neither are means provided for detecting a nibble or for setting a hook.

Ford in U.S. Pat. No. 5,570,534 discloses a fishing rod jigger and automatic hook setting device. This invention is limited in that it relies on a rotating cam-type design to impart a regular, oscillating, up-and-down motion ("oscillation") to the tip of a fishing rod. The invention is further limited in that means are not provided to secure the fishing rod in the device. Moreover, during trolling, rapid movement of the rod tip in the direction opposite that of the motion of the boat is not possible because of the shape of the cam.

Knepp in U.S. Pat. No. 6,009,656 discloses an automatic jigging device for a fishing pole. This invention is limited in that it relies on a rotating cam-type design to impart a regular, oscillating, up-and-down or side-to-side motion to the tip of a fishing rod. The invention is further limited in that changing the cam is necessary to affect a change in magnitude of the jigging motion and in that means are not provided to secure the fishing rod in the device. Moreover, during trolling, rapid movement of the rod tip in the direction opposite that of the motion of the boat is not possible because of the elliptical shape of the cam. Neither are means provided for detecting a nibble or for setting a hook.

Christiansen in United Kingdom Patent No. 1,025,415 discloses an automatic fishing machine. This invention is limited in that it relies on a motor-driven, rotating reel-type design to impart a regular, oscillating, up-and-down motion to a fishing line.

No single reference and no combination of the references disclose a rod holder that is programmable as that term is used herein. The background art does not teach the structure or function of the subject invention.

BRIEF SUMMARY OF THE INVENTION

A general purpose of the invention is to improve fishing success. Another general purpose of the invention is to avoid fatigue of a fisherman's arms and hands during fishing. Yet another purpose is render bait or lure more lifelike by automatically moving a rod forward and backward, through unlimited changeable programmed movements that can be forward or backward and or up and down. A further purpose is render bait or lure more lifelike when ice or pier or drift fishing by moving the rod up and down to simulate jigging as well as other fishing processes.

One advantage of the invention is that a wide range of fishing rod movements are supported, including erratic movements that increase fishing success. Another advantage of the invention is that operational modes include fishing (both trolling and jigging), setting a hook and playing a fish.

The invention is an apparatus and method for automated movement of a fishing rod. A preferred embodiment of the apparatus comprises a quick-release receptacle for a fishing rod, a drive mechanism, means for connecting the receptacle to the drive mechanism, a programmable controller, an input/output device and a mounting bracket. Less preferred alternative embodiments include a downrigger system.

In use, a preferred embodiment of the invention is operated by mounting the unit in either a horizontal (housing on its side) or vertical (housing upright) position, applying power to the unit, allowing the unit to move the receptacle automatically to the home position (with adjustments provided through the programming panel), setting the direction of operation, inputting the rod length (if desired), inputting the boat speed, selecting the stored program for the unit to follow, inputting the range of motion (if desired) and increasing or decreasing the sensitivity of the back pressure threshold. During operation, the unit executes program statements to move the fishing rod. Upon detecting a fish-on condition, the unit operates to set the hook, to play the fish and to emit an alarm.

In broad terms, a preferred embodiment of the apparatus is a holder for a fishing rod or pole, said fishing rod or pole having a reel and a tip, said holder comprising: a quick-release receptacle for receiving the end of said fishing rod adjacent said reel, said quick-release receptacle having a male portion and a female portion; a drive mechanism having a drive shaft; a rod connection mechanism connecting said quick-release receptacle to said drive mechanism; a programmable controller for said drive mechanism, said programmable controller being programmed to generate a control signal in response to a selection by a user; and a mounting bracket for attaching said drive mechanism to a watercraft or a stationary body; wherein said drive mechanism moves said rod connection mechanism in a partial revolution in response to said control signal, which causes said quick-release receptacle to move which moves said tip.

In another preferred embodiment, the mounting bracket is configured for rail and hard-surface mounting and is adaptable to hold the unit in both horizontal and vertical positions. Preferably, the mounting bracket may also be affixed to a portable stand in scenarios such as ice fishing and shore fishing.

In another preferred embodiment, the invention is the above apparatus wherein said rod connection mechanism is configured as an elbow with a female connector at a first end that connects to the drive shaft and an annular groove and a female collar at a second end, the female collar containing four pins offset at ninety-degree angular increments, said annular groove and said female collar being configured to allow attachment of the rod connection mechanism to the quick release receptacle.

In another preferred embodiment, the invention is the above apparatus wherein said quick-release receptacle comprises a rod-receiving member having a female portion and a male portion, a diameter reduction member and a lever member. The male portion of the rod-receiving member has a shoulder containing four recesses offset at ninety-degree angular increments and a central cylindrical member that is configured to be insertable in the female connector of the rod connection mechanism. The lever member, which has a curved stop at one end and a lever arm at another end, is connected to the rod receiving member with pins and biased in a locked position by means of a spring. When the male portion of said rod-receiving member is fully inserted in the female collar of the rod connection mechanism, the curved stop of the rod-receiving member seats in the annular groove of said rod connection mechanism. The female portion is configured to provide a threaded tubular cavity having a mouth for receiving the reel end of the fishing rod or pole. When the reel end of the fishing rod or pole is inserted in the threaded tubular cavity, said reel end is secured to the quick-release receptacle by moving the diameter reduction member away from the male portion. Movement of the diameter reduction member in this way reduces the diameter of the mouth of the cavity from about one and one-quarter inch to about seven-eights of an inch.

In another preferred embodiment, the invention is the above apparatus wherein said drive mechanism comprises: a motor; a torque increase gear and drive shaft connected to said motor; and a position-sensing switch capable of sensing the position of said rotatable rod holder drive shaft. Preferably, the motor is a direct-current (DC) motor and said torque increase gear and drive shaft has an enclosed worm and a torque increase gear. Preferably, the drive shaft is a single-ended extension of the axis of the torque increase gear and is attached to the female connector at the first end of the rod connection mechanism. Preferably, the drive shaft is secured to the female connector by means of a pin that is inserted through the rod connection mechanism and passes perpendicularly through the drive shaft.

In another preferred embodiment, the invention is the above apparatus wherein said drive mechanism is housed in a container that excludes water and the drive shaft protrudes from said container.

In another preferred embodiment, the invention is the above apparatus wherein said programmable controller is capable of causing said rod receptacle, and, hence, said rod tip to move left to right, right to left, up to down and down to up at a plurality of user-selected distances, speeds and time intervals.

In another preferred embodiment, the invention is the above apparatus wherein said programmable controller is programmable by means of an input device, such as a keyboard, and an output device, such as a display.

In another preferred embodiment, the invention is the above apparatus wherein said mounting bracket is configured to attach said holder to a boat or to a stationary body in an orientation selected from the group consisting of: attachment with said rod connection mechanism extending essentially horizontally, which causes said receptacle, and, hence, said rod tip to move up and down, and attachment with said rod connection mechanism extending essentially vertically, which causes said receptacle, and, hence, said rod tip to move side to side.

In another preferred embodiment, the invention is the above apparatus wherein said programmable controller is programmed with a program to cause the tip of the rod to rise and set a hook in a fish's mouth when the position-sensing switch senses and the program detects an increase in line pressure that is above the threshold set during an initiation step.

In another preferred embodiment, the invention is the above apparatus further comprising: means for sensing or inputting the speed of said watercraft and for transmitting a speed signal to said programmable controller, which speed signal is used by said programmable controller in determining the magnitude of the partial revolution.

In broad terms, another preferred embodiment of the invention is a method of fishing with a rod that has a reel or handle at first end and a tip at second end comprising the steps of: attaching an electronic rod holder having a programmable controller to a watercraft or stationary object; attaching a lure or baited hook to a line that is attached to said rod at or through said tip and placing said lure or baited hook in water having a fish; securing said first end of said rod in said rod holder; selecting a program resident in said programmable controller that causes said rod holder to move said tip in a motion selected from the group consisting of up and down, and side to side; detecting a bite by said fish; setting the hook in the mouth of said fish; playing said fish; and removing said rod from said rod holder and retrieving the hooked fish.

In another preferred embodiment, the invention is the above method further comprising the step: detecting a nibble before a bite has occurred; and moving said tip in a direction that causes said lure or baited hook to pause or move more slowly in said water than it had been moving before the nibble was detected.

In a further preferred embodiment, the invention is a computer-readable medium having stored thereon a sequence of instructions that, when executed by a processor, cause the processor to perform the steps of a method recited herein. In yet another embodiment, the invention is a fishing system comprising a watercraft having the smart rod holder disclosed herein attached to it.

Another preferred embodiment of the invention is a system for implementing the sequence of instructions stored on the computer-readable medium of the invention. Yet another preferred embodiment of the invention is a process of operating a fishing system, said fishing system comprising a watercraft, a fishing rod and a smart rod holder comprising a programmable controller, said process comprising: a fisherman's inserting said fishing rod in said smart rod holder and interacting with said programmable controller, said interacting comprising: adjusting said smart rod holder to a home position, setting a direction of operation, selecting a rod length option, selecting a watercraft speed option, selecting a rod movement option, selecting a program option, selecting a speed of backward rod movement option; and selecting a speed of forward rod movement option. Preferably, this embodiment of the invention further comprises inputting a program option. Another preferred embodiment of the invention is system that is programmed to implement a sequence of instructions that causes a smart rod holder to display to a fisherman the above options.

Another preferred embodiment of the invention is a rod holder comprising: a receptacle for a fishing rod; a windshield wiper motor mechanism having a drive shaft that is attached to said receptacle; and a programmable controller for controlling the operation of said windshield wiper motor.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings:

FIG. 7 is an exploded view of the rod-holding subassembly of a preferred embodiment of the invention.

FIG. 8 is a side view of the rod connection mechanism of a preferred embodiment of the invention.

FIG. 9 is a plan view of the female connector or motor shaft plate of a preferred embodiment of the invention.

FIG. 14 is an illustration of the display panel during the power-on state.

FIGS. 15A and 15B are illustrations of the display panel during the selection of the direction of operation.

FIGS. 16A through 16E are illustrations of the display panel during the selection of the rod length.

FIGS. 17A through 17C are illustrations of the display panel during the selection of boat speeds zero miles per hour, one mile per hour and nine miles per hour, respectively.

FIGS. 18A through 18D are illustrations of the display panel during the selection of the type of rod movement.

FIGS. 19A and 19B are illustrations of the display panel during selection of the stored program.

FIGS. 20A through 20D are illustrations of the display panel during the selection of the backward rod movement speed.

Figure 1:
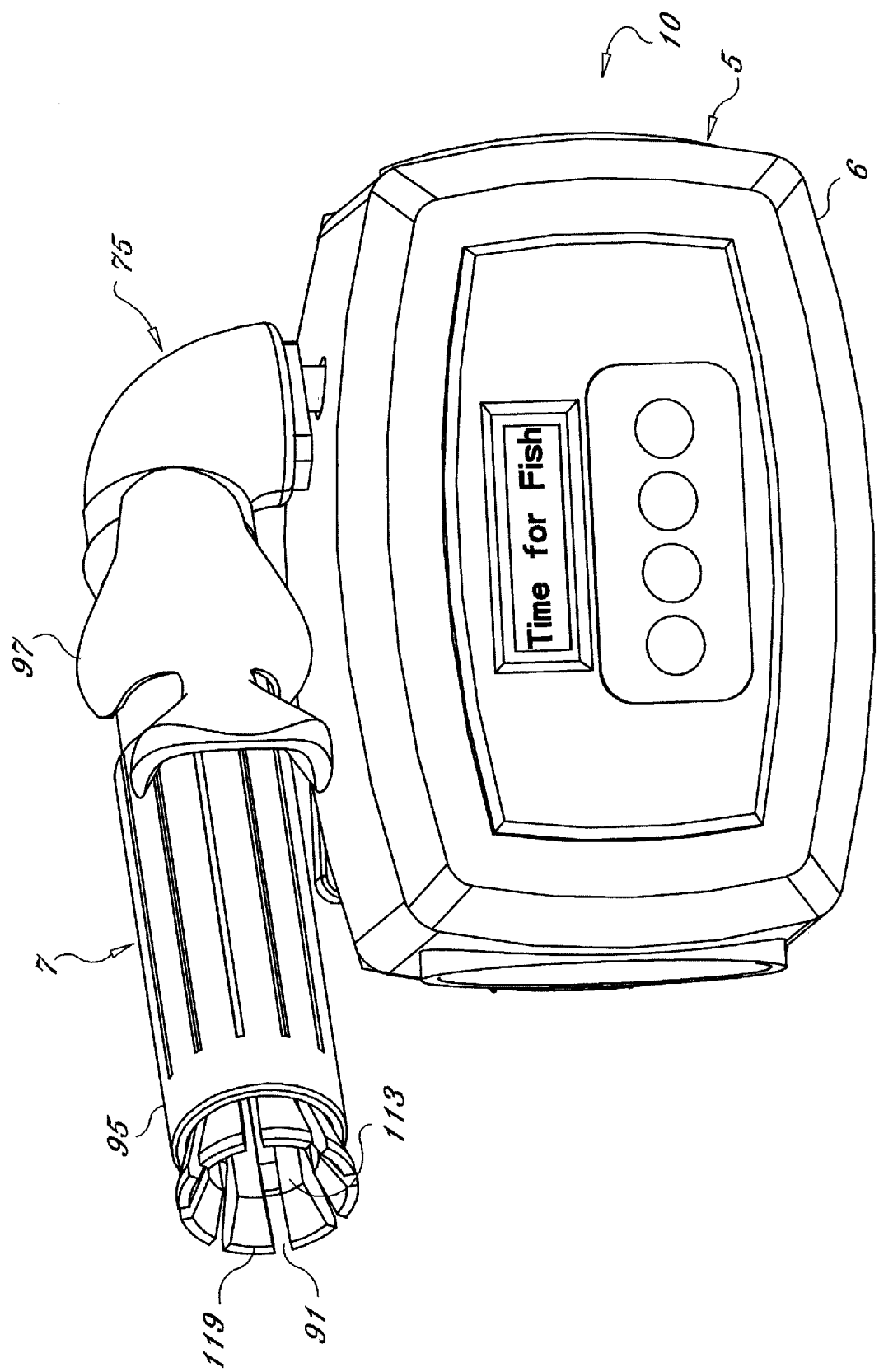
FIG. 1 is a perspective view of a preferred embodiment of the device with the housing in the upright position.

The following reference numerals are used to indicate the parts and environment of the invention on the drawings:

1 first arc
2 second arc
3 third arc
5 case subassembly
6 salt water resistant housing, housing
7 rod-holding subassembly
9 mounting bracket subassembly
10 smart rod holder
12 keypad
15 drive shaft bolt
16 drive shaft
17 hole
18 encoder
26 motor bracket
27 motor
28 worm gear and torque gear mechanism
30 sealed control circuit board, printed circuit board, circuit board
32 liquid crystal display, display
36 rod holder quick disconnect
37 quick-release receptacle
41 quick disconnect reflector plate
42 female portion
43 male portion
44 gear box bolts
50 base plate
51 base bracket bolts
52 base bracket
54 swivel gaskets
56 swivel
58 swivel screw
64 swivel pin
66 swivel plate
68 tab lock base
72 slots
75 rod connection mechanism
77 quick-release receptacle
79 female connector, motor shaft plate
80 plate bolt
81 first end
83 annular groove
84 aperture
85 female collar
86 second end
87 lugs
89 fishing-rod-receiving member
91 female portion
93 central cylindrical member
94 male portion
95 diameter reduction member
97 lever member
101 shoulder
103 recesses
105 curved stop
107 lever arm
109 pins
111 tubular cavity
113 mouth
115 outside surface
117 inside surface
119 fingers
150 Power On step
152 Adjust Home Position step
154 Set Home step
156 Correct Mount Position step
158 Repositioned step
160 Change Direction step
162 Toggle step
164 Change Rod Length step
166 Set Length Six Feet step
168 Set Length Seven Feet step
170 Set Length Eight Feet step
172 Set Length Nine Feet step
174 Set Length Ten Feet step
178 Change Boat Speed step
180 Set Speed Zero Mph step
182 Set Speed One Mph step
184 Set Speed Two Mph step
186 Set Speed Three Mph step
188 Set Speed Four Mph step
190 Set Speed Five Mph step
192 Set Speed Six Mph step
194 Set Speed Seven Mph step
196 Set Speed Eight Mph step
198 Set Speed Nine Mph step
202 Change Rod Movement step
204 Degree Rod Movement step
206 Feet Rod Movement step
208 Back Pressure Rod Movement step
210 Random Rod Movement step
214 Change Program Selection step
216 Program One Selection step
218 Program Two Selection step
220 Program Three Selection step
222 Program Four Selection step
224 Program Five Selection step
226 Program Six Selection step
228 Program Seven Selection step
230 Program Eight Selection step
232 Program Nine Selection step 236 Change Backward Rod Movement step
238 Back Fast Rod Movement step
240 Back Medium Rod Movement step
242 Back Slow Rod Movement step
244 Back Program Rod Movement step
248 Change Forward Rod Movement step
250 Forward Fast Rod Movement step
252 Forward Medium Rod Movement step
254 Forward Slow Rod Movement step
256 Forward Program Rod Movement step
260 Change Maximum Forward Arc step
262 Maximum Forward Arc Ninety step
264 Maximum Forward Arc One Hundred step
266 Maximum Forward Arc One Hundred Ten step
268 Maximum Forward Arc One Hundred Twenty step
270 Maximum Forward Arc One Hundred Thirty step
272 Maximum Forward Arc One Hundred Forty step
274 Maximum Forward Arc One Hundred Fifty step
276 Maximum Forward Arc One Hundred Sixty step
278 Maximum Forward Arc One Hundred Seventy step
280 Maximum Forward Arc One Hundred Eighty step
284 Change Maximum Backward Arc step
286 Maximum Backward Arc Ninety step
288 Maximum Backward Arc Eighty step
290 Maximum Backward Arc Seventy step
292 Maximum Backward Arc Sixty step
294 Maximum Backward Arc Fifty step
296 Maximum Backward Arc Forty step
298 Maximum Backward Arc Thirty step
300:Maximum Backward Arc Twenty step
302 Maximum Backward Arc Ten step
304 Maximum Backward Arc Zero step
308 Rod In and Enter step
310 Set Back Pressure Threshold step
312 Adjust Threshold from Setting step
314 Threshold Less Three step
316 Threshold Less Two step
318 Threshold Less One step
320 Threshold Test Zero step
322 Threshold More One step
324 Threshold More Two step
326 Threshold More Three step
328 Set Fish On Threshold step
332 Time to Fish and Enter Start step
334 Enter to Pause Before step
336 Fish On Threshold Reached step
338 Set Hook step
340 Sound Alarm and Play the Fish step
342 Enter to Pause After step

DETAILED DESCRIPTION OF THE INVENTION

Figure 2:
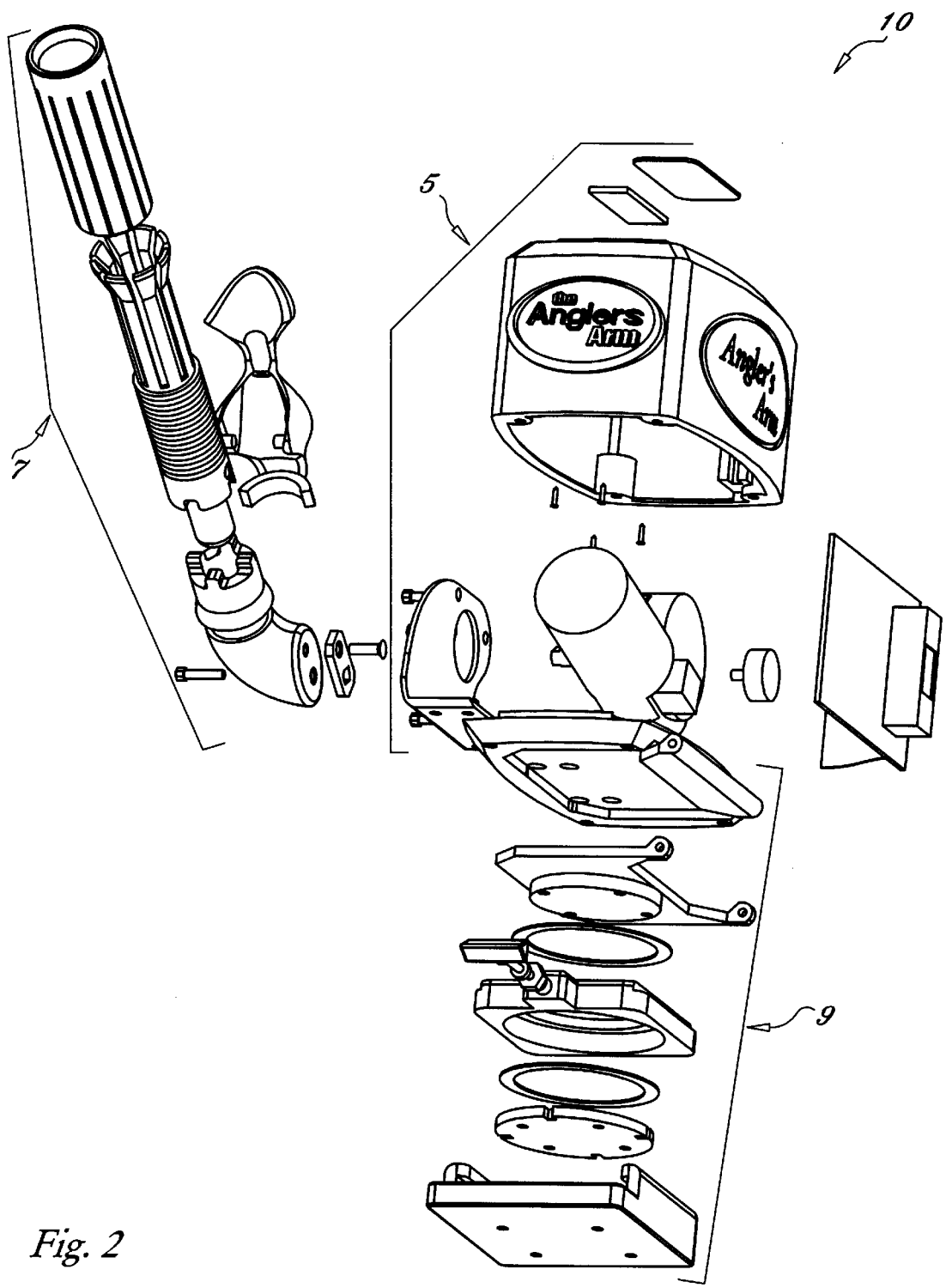
FIG. 2 is an exploded view of a preferred embodiment of the device with the housing in the upright position.

Referring to FIGS. 1 and 2, a preferred embodiment of smart rod holder 10 is illustrated. This embodiment is named the Angler's Arm™. Smart rod holder 10 comprises case subassembly 5, rod-holding subassembly 7 and mounting bracket subassembly 9. Electrical power is supplied to smart rod holder 10 via a power cord (not shown).

Figure 3:
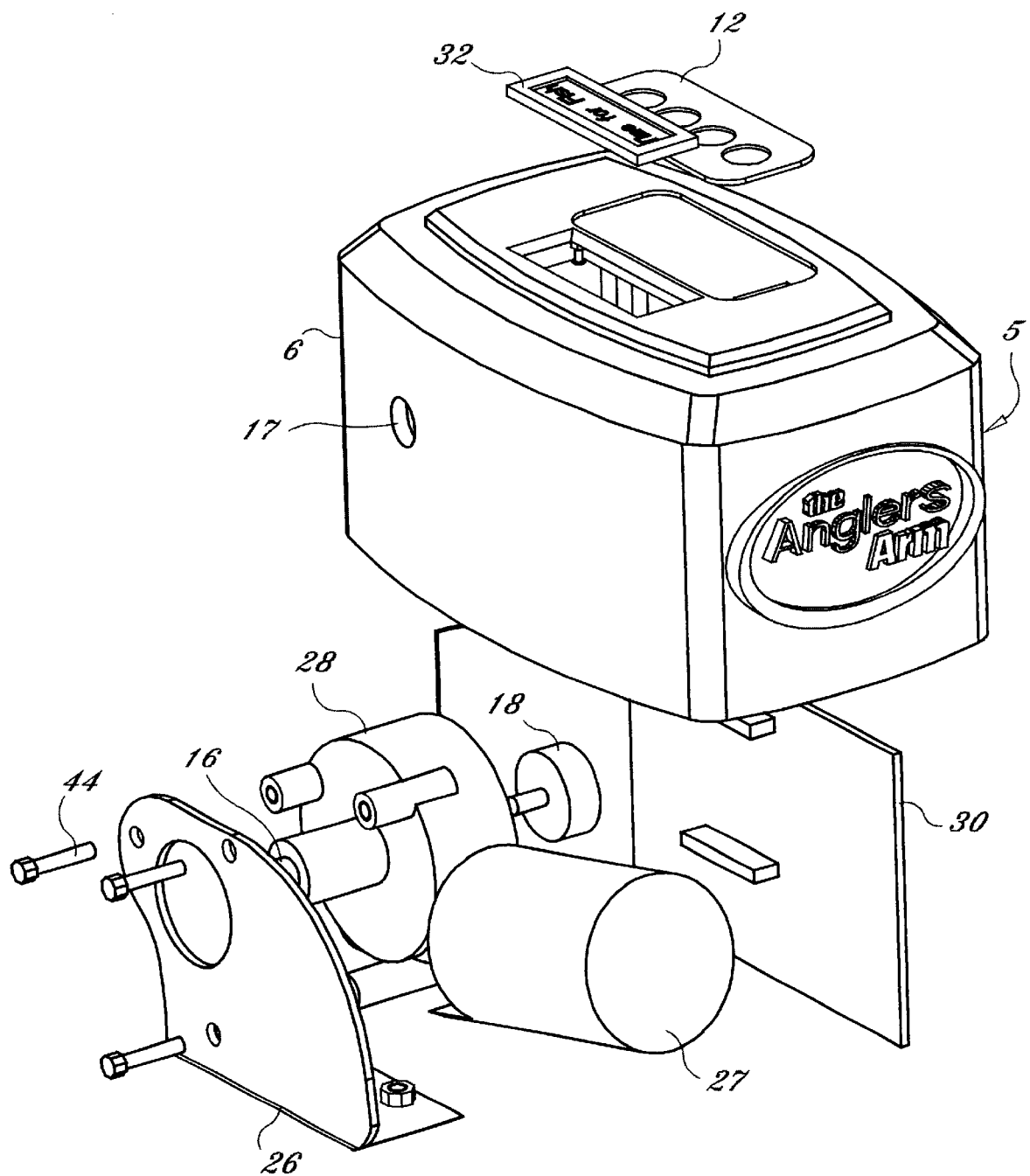
FIG. 3 is an exploded view of the case subassembly of a preferred embodiment of the invention.

Referring to FIG. 3, an exploded view of the case subassembly 5 of a preferred embodiment of smart rod holder 10 is presented. Case subassembly 5 comprises salt water resistant housing 6, keypad 12, liquid crystal display (LCD) 32, printed circuit board 30, motor 27, worm gear and torque gear mechanism 28, motor bracket 26, motor bracket bolts 44 and encoder 18. Motor 27 and worm gear and torque gear mechanism 28 are preferably a prefabricated combination. Gear box bolts 44 are used to attach worm and torque gear mechanism 28 and motor 27 to motor bracket 26. A salt water resistant housing seal (not shown) provides a seal between housing 6 and base bracket 46. A power cord (not shown) protrudes from housing 6. Drive shaft 16 protrudes through hole 17 in housing 6 when case subassembly is assembled.

Figure 4:
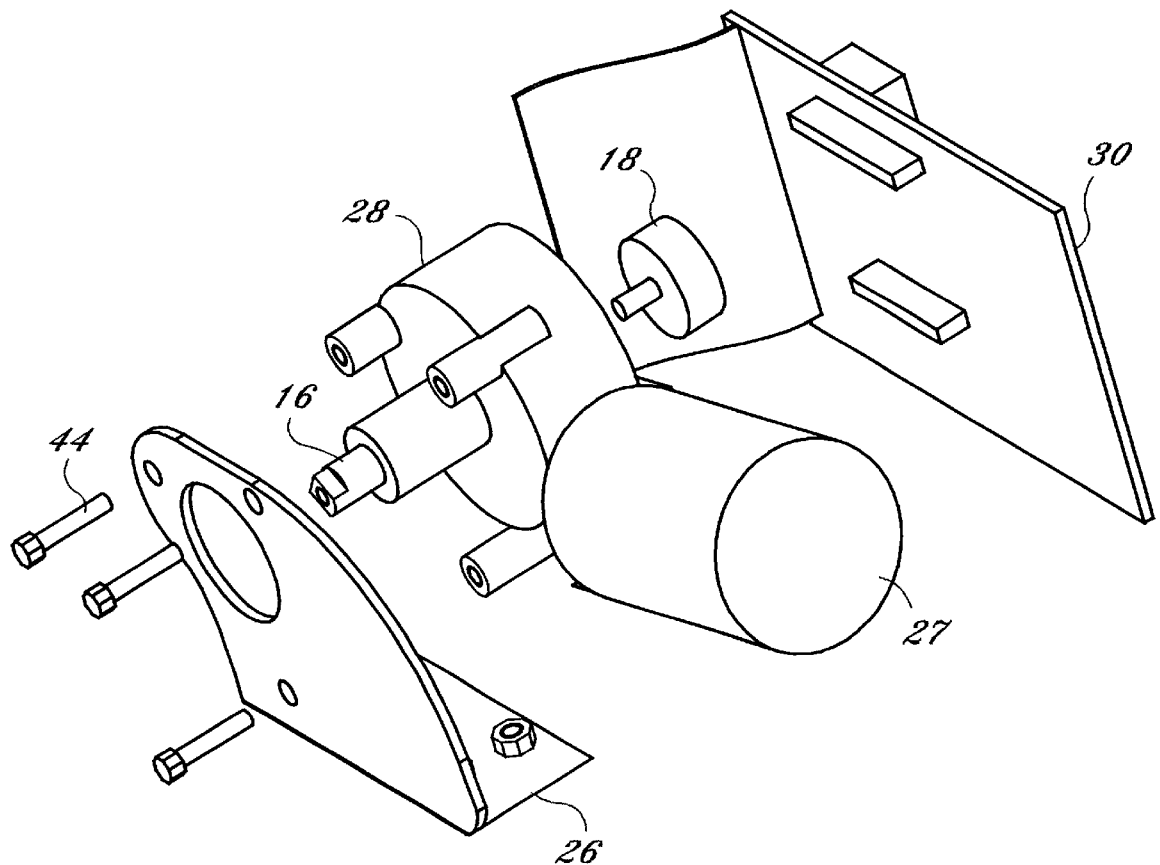
FIG. 4 is an exploded view of selected components of the case subassembly of a preferred embodiment of the invention.

Referring to FIG. 4, an exploded view of selected components of case subassembly 5 of a preferred embodiment of the invention is presented. Torque is transmitted from motor 27 to drive shaft 16 via worm gear and torque gear mechanism 28. In a preferred embodiment, the rate of rotation of drive shaft is 16 reduced and the torque capability of motor 27 is increased by a factor of about 8 to 1 by this arrangement. Preferably, water is prevented from entering housing 9 at the location that drive shaft 16 exits housing 6 through hole 17 by means of Teflon seats or gaskets (not shown).

Position detection mercury switch (not shown) senses whether smart rod holder 10 is on its side or upright. When housing 6 is on its side, the switch is closed. Otherwise, the switch is open. Encoder 18 is a rotary position sensor. Preferably, the shaft of encoder 18 shaft is glued into a hole that is drilled into the back end of drive shaft 16. By means of encoder 18, smart rod holder 10 can determine where the fishing pole is pointing and know what movements the motor is making so motor 27 can be controlled via the programmable controller. Encoder 18 is provided with a ribbon cable (not shown) that connects it to circuit board 30.

Figure 5A:
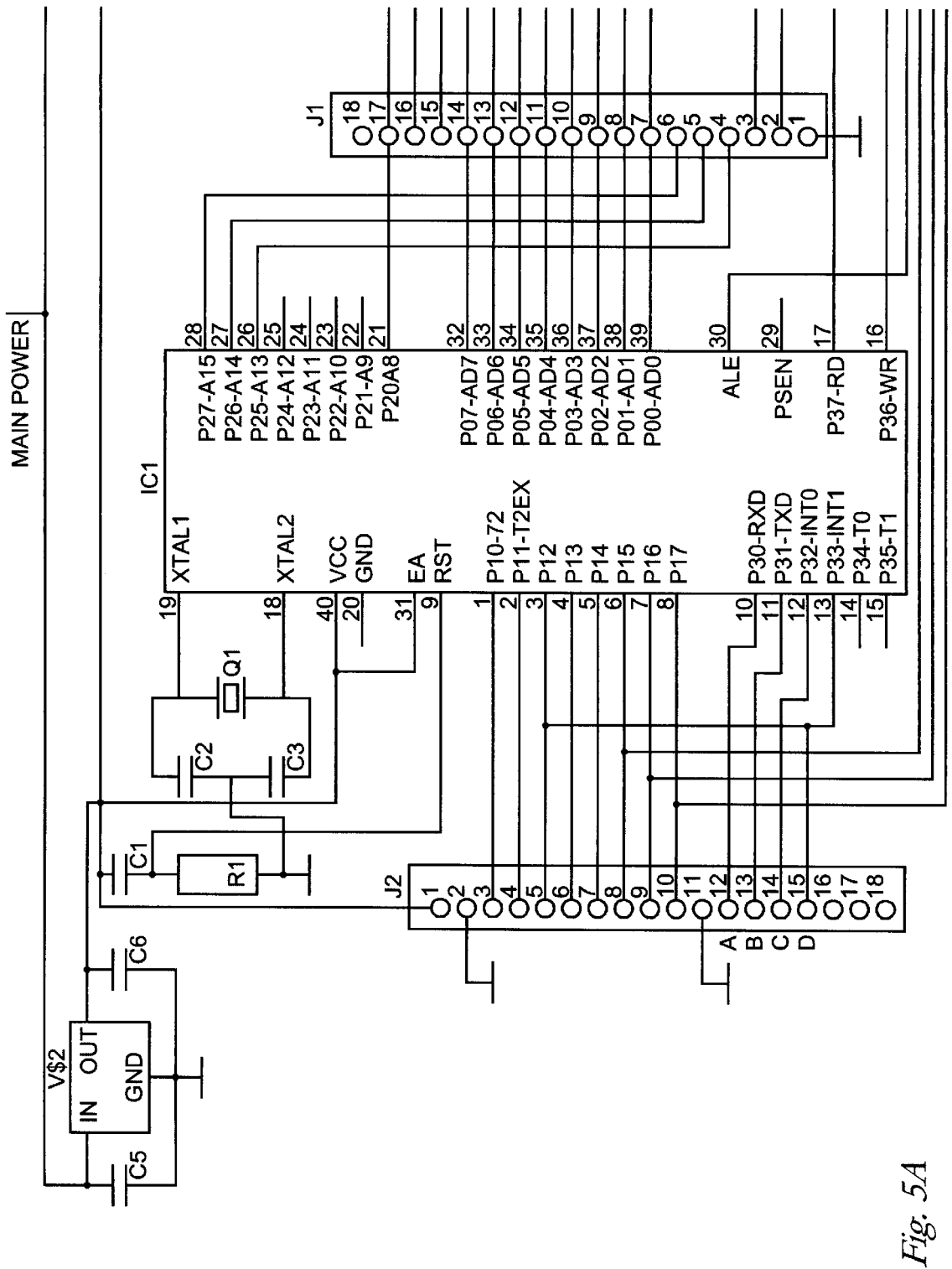
FIGS. 5A and 5B illustrate the left portion and the right portion, respectively, of a circuit diagram for the sealed control circuit board of a preferred embodiment of the invention.
Figure 5B:
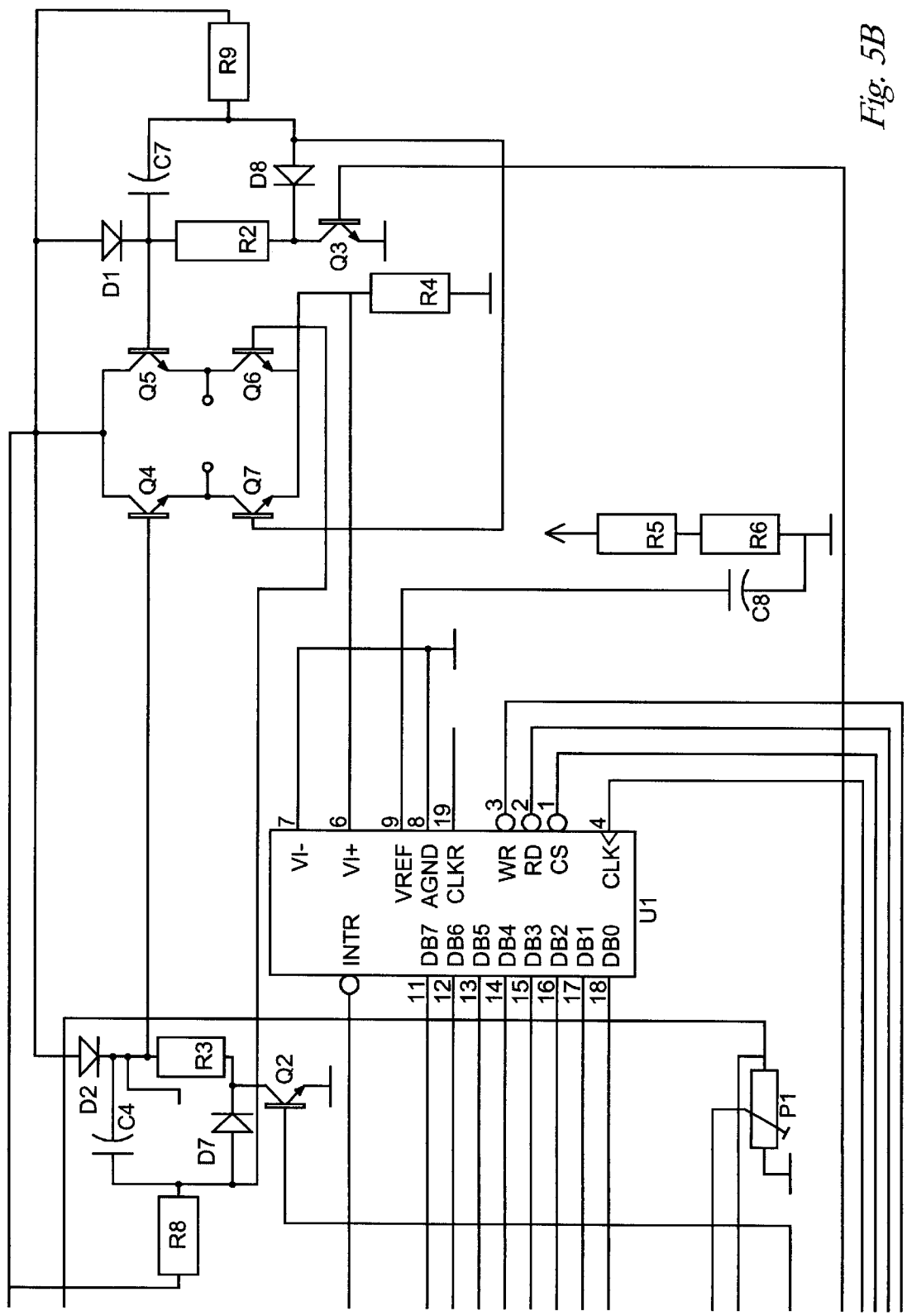

Referring to FIGS. 5A and 5B, the left portion and right portion of a circuit diagram for sealed control circuit board or printed circuit board 30 of a preferred embodiment of the invention are presented. In this embodiment, sealed control circuit board 30 includes the components listed in Table 1.

TABLE 1

Printed Circuit Board Components

| Part | Value | Device | Package | Library |
|---|---|---|---|---|
| C1 | CAP | CAP | 1210 | DEMO |
| C2 | CAP | CAP | 1210 | DEMO |
| C3 | CAP | CAP | 1210 | DEMO |
| C4 | CAP-5 | CAP-5 | C-5 | DISCRETE |
| C5 | CAP | CAP | 1210 | DEMO |
| C6 | CAP | CAP | 1210 | DEMO |
| C7 | CAP-5 | CAP-5 | C-5 | DISCRETE |
| C8 | CAP-2,5 | CAP-2,5 | C-2,5 | DISCRETE |
| D1 | 1.2K | DIODE-2,5 | D-2,5 | DISCRETE |
| D2 | D | DIODE-2,5 | D-2,5 | DISCRETE |
| D7 | D | DIODE-2,5 | D-2,5 | DISCRETE |
| D8 | D | DIODE-2,5 | D-2,5 | DISCRETE |
| IC1 | 8051 | 8051 | DIL40 | INTEL |
| J1 | 1X18 | 1X18 | 1X18 | DEMO |
| J2 | 1X18 | 1X18 | 1X18 | DEMO |
| P1 | LI10 | LI10 | LI10 | TRIMPOT |
| Q1 | 86SMX | 86SMX | 86SMX | QUARTZ |
| Q2 | 2N2222 | 2N2222 | TO18A | TRANS-SM |
| Q3 | 2N2222 | 2N2222 | TO18A | TRANS-SM |
| Q4 | IGBT | 2N2222 | TO18A | TRANS-SM |
| Q5 | IGBT | 2N2222 | TO18A | TRANS-SM |
| Q6 | IGBT | 2N2222 | TO18A | TRANS-SM |
| Q7 | IGBT | 2N2222 | TO18A | TRANS-SM |

TABLE 1-continued

Printed Circuit Board Components

| Part | Value | Device | Package | Library |
|------|-------|--------|---------|---------|
| R1 | RES | RES | 1210 | DEMO |
| R2 | 1.2K | RES | 1210 | DEMO |
| R3 | 1.2k | RESEU-5 | R-5 | DISCRETE |
| R4 | .47 5W | RESEU-5 | R-5 | DISCRETE |
| R5 | RESEU-5 | RESEU-5 | R-5 | DISCRETE |
| R6 | RESEU-5 | RESEU-5 | R-5 | DISCRETE |
| R8 | 1.2k | RESEU-5 | R-5 | DISCRETE |
| R9 | 1.2K | RESEU-5 | R-5 | DISCRETE |
| V$2 | REG | REG@2 | REG | DEMO |
| U1 | ADC0801 | ADC0801 | DIL20 | LINEAR |

Preferably, the programmable controller mounted on printed circuit board 30 (part IC1 on FIG. 5A) is a AT89C51 monolithic chip manufactured by Atmel Corporation of San Jose, Cailf. The AT89C51 chip comprises a low-power, high-performance CMOS 8-bit microcomputer or microcontroller (CPU) with four kilobytes of flash programmable and erasable read only memory (PEROM). The device is manufactured using high-density nonvolatile memory technology to provide a computer-readable medium having stored thereon a sequence of instructions and is compatible with the industry-standard MCS-51 instruction set and pinout. The on-chip PEROM allows the program memory to be reprogrammed in-system or by a conventional nonvolatile memory programmer.

In a preferred embodiment, a fisherman/user interacts with smart rod holder 10 by means of keypad 12 and liquid crystal display 32. User instructions and selection options are displayed to the user on display 32 and the user inputs his choices via keyboard 12. Input entered via keyboard 12 is transmitted to programmable controller IC1 mounted on printed circuit board 30 via a ribbon cable (not shown). A software program comprising a sequence of instructions that is resident in programmable controller IC1 directs the operation of the components of rod holder 10, including motor 27.

Figure 6:
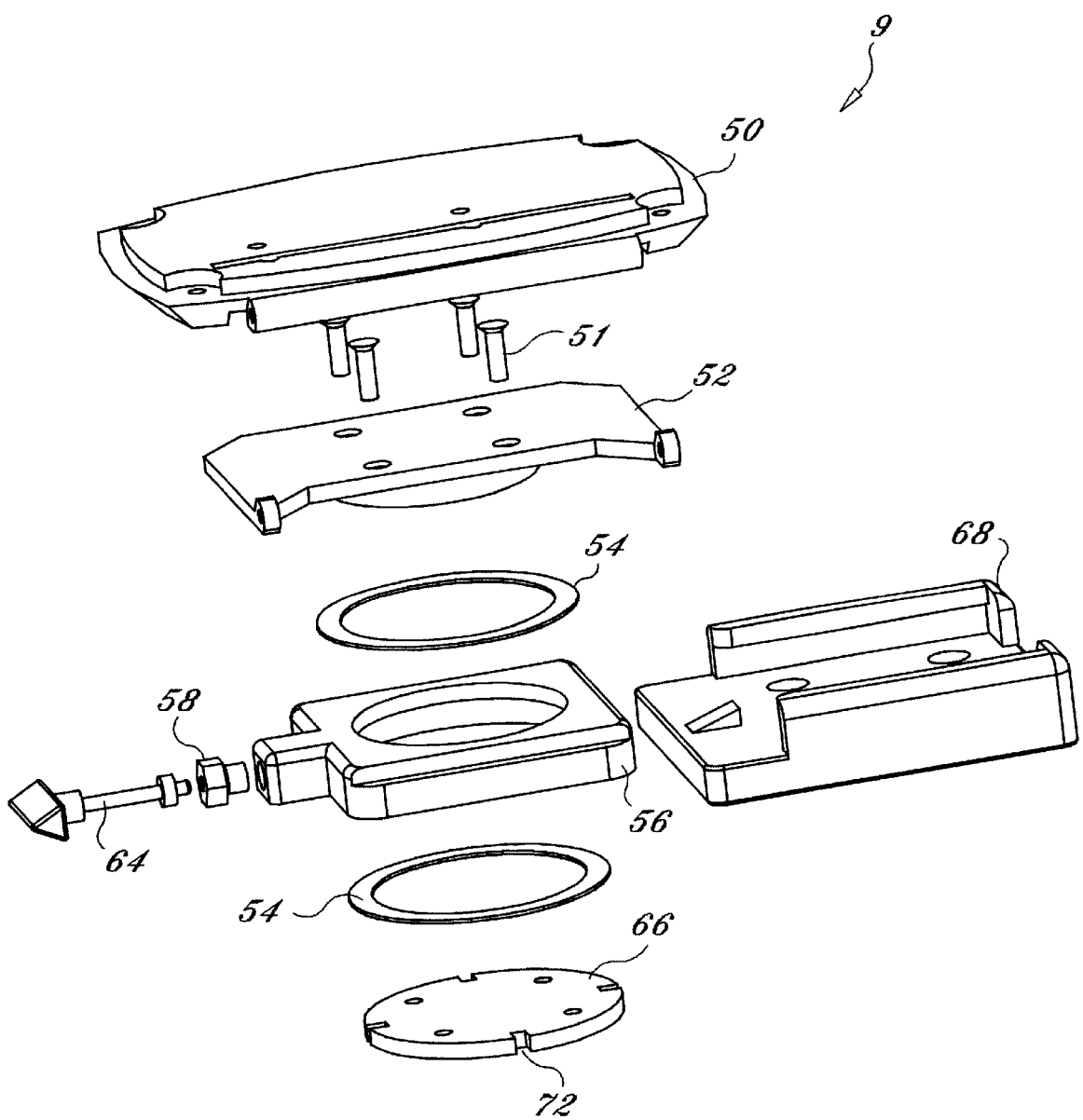
FIG. 6 is an exploded view of the mounting bracket subassembly of a preferred embodiment of the invention.

Referring to FIG. 6, an exploded view of mounting bracket subassembly 9 of a preferred embodiment of the invention is presented. Mounting bracket subassembly comprises base plate 50, base bracket bolts 51, base bracket 52, swivel gaskets 54, swivel 56, swivel screw 58, swivel pin 64 and swivel plate 66. A hinge pin (not shown) is used to movably connect base plate 50 to base bracket 52. Thus, base plate 50 can either rest flat on base bracket 52 or rest at an orientation perpendicular to base bracket 52. Swivel gaskets 54 lie on either side of swivel 56 which is rotatably disposed between base bracket 52 and swivel plate 66. Base bracket bolts 51 are used to attach base bracket 52 to swivel plate 66. When thus assembled, swivel 56 can be snapped into tab lock base 68. Swivel screw 58 is used to attach swivel pin 64 to swivel 56. By means of swivel pin 64, a fisherman can arrest the rotation of swivel 56 by inserting the end of swivel pin 64 into one of slots 72 in the periphery of swivel plate 66. Motor bracket bolts (not shown) are used to attach motor bracket 26 to base plate 50. Base plate bolts (not shown) are used to attach base plate 50 to the bottom of housing 6.

Preferably, the hinge pin (not shown) is configured similarly to a quick release bolt on the front axle of most bicycles so it can be loosened and tightened quickly and with no tools. The hinge pin is tightened when the unit is in the normal (upright) position and then loosened while the unit is tipped into its 90-degree position (on its side) and then tightened again.

In a preferred embodiment, tab lock base 68 (preferably a component manufactured by Cannon) is secured to a boat or stationary object. In another preferred embodiment, mounting bracket subassembly 9 includes a security feature that requires that a key be used to unlock it when the fisherman wishes to remove the device from the boat or stationary object on which it has been mounted.

Referring to FIGS. 7 and 8, rod-holding subassembly 7 preferably comprises rod connection mechanism 75 and quick-release receptacle 77. Rod connection mechanism 75 is configured as an elbow with female connector or motor shaft plate 79 at first end 81 that accepts drive shaft 16 and annular groove 83 and female collar 85 at second end 86. Female collar 85 contains four lugs 87 offset at ninety-degree angular increments. Annular groove 83 and female collar 85 are configured to allow attachment of rod connection mechanism 75 to quick release receptacle 77. In a preferred embodiment, female connector or motor shaft plate 79, shown in plan view in FIG. 9, is bolted onto first end 81 by means of plate bolt 80. Aperture 84 accepts the end of drive shaft 16. Drive shaft bolt 15 screws into the end of drive shaft 16 and secures rod connection mechanism 75 to drive shaft 16.

Figure 10:
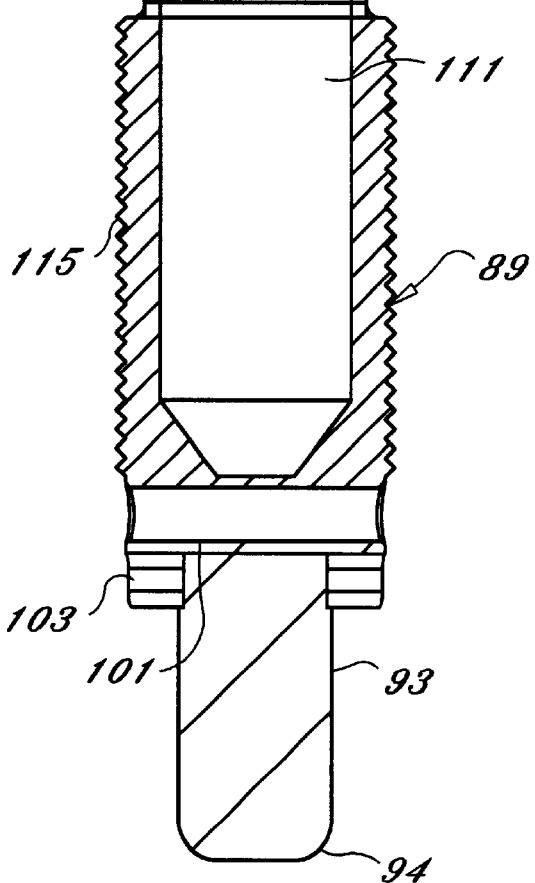
FIG. 10 is a cross-sectional view of the fishing-rod-receiving member of a preferred embodiment of the invention.
Figure 11:
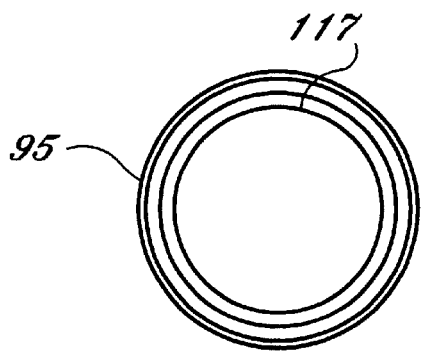
FIG. 11 is a cross-sectional view of the diameter reduction member of a preferred embodiment of the invention.

Referring to FIGS. 7, 10 and 11, quick-release receptacle 77 preferably comprises fishing-rod-receiving member 89 having female portion 91 and male portion 94, diameter reduction member 95 and lever member 97. Preferably male portion 94 of the fishing-rod-receiving member 89 comprises shoulder 101 containing four recesses 103 that are offset at ninety-degree angular increments that are configured to accept lugs 87 and central cylindrical member 93 that is configured to be insertable into female collar 85 of rod connection mechanism 75. Lever member 97, which has curved stop 105 at one end and lever arm 107 at another end, is connected to fishing-rod-receiving member 89 with pins 109 which fit in indents 96 and is biased in a locked position by means of a spring (not shown) which pushes lever arm 107 away from fishing-rod-receiving member 89. When central cylindrical member 93 of fishing-rod-receiving member 89 is fully inserted in female collar 85 of rod connection mechanism 75, curved stop 105 seats in annular groove 83.

Preferably, female portion 91 is configured to provide tubular cavity having mouth 113 for receiving the reel end of the fishing rod or pole (not shown). Outside surface 115 of fishing-rod-receiving member 89 and inside surface of diameter reducing member 95 have threads and, when rod-holding subassembly 7 is assembled, diameter reducing member 95 is threaded onto rod-receiving member 89. When the reel end of the fishing rod or pole is inserted in threaded tubular cavity 111, the reel end is secured to quick-release receptacle 77 by spinning diameter reduction member 95, shown in cross section in FIG. 11, around rod-receiving member 89 which moves diameter reduction member 95 away from male portion 93. Movement of diameter reduction member 95 in this way reduces the diameter of mouth 113 of cavity 111 from about one and one-quarter inch to about seven-eights of an inch by moving fingers 119 inward, thus securing the rod in receptacle 77. When is fish is hooked, receptacle 77 may be quickly released from rod connection mechanism 75 be depressing lever arm 107.

Preferably, fishing-rod-receiving member 89 and inside surface of diameter reducing member 95 fit together in a manner similar to a drill collet. Fishing-rod-receiving member 89 is threaded on the entire smooth cylindrical surface between indents 96 at which pins 109 attach and the point at which the eight axial slits that form fingers 119 begin. Diameter reducing member 95 is threaded on entire inside surface 117. Diameter reducing member 95 fits around the fishing-rod-receiving member 89 almost completely covering thin fingers 119 created by the eight axial cuts. The fishing pole handle is inserted with diameter reducing member in an "unthreaded" position, that is it is spun on the threads until it is all the way back almost touching pins 109. When the pole is completely seated in tubular cavity 111, diameter reducing member 95 is turned and "tightened" and it moves on the threads toward the end of fishing-rod-receiving member 89, covering more and more of the length of fingers 119 until it hits the angled flange or ramp on the end of fingers 119. Since diameter reducing member 96 has a smaller diameter than the outside edge of fingers 119, fingers 119 begin to bend inward on the fishing pole handle until they are tight against it. In this way, the mechanism operates in a way that is similar to the way that a drill collet operates.

Preferably, housing 6, most of the components of mounting bracket subassembly 9 and most of the components of rod-holding subassembly 7 will be fabricated from a rigid plastic, e.g., nylon. The preferred method of fabrication of these parts is injection molding. Base bracket 52 is preferably punched out of one-quarter-inch steel sheet. Swivel gaskets 54 are preferably fabricated from Teflon® sheets. Motor 27 and worm gear and torque gear mechanism 28 are preferably purchased as a unitary windshield wiper mechanism from an automobile parts manufacturer.

Figure 12:
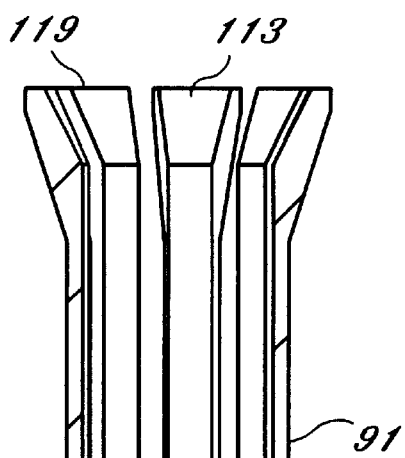
FIG. 12 is an illustration of the range of motion that a preferred embodiment of the invention can impart to a fishing rod during operation of the unit with the housing on its side.
Figure 13:
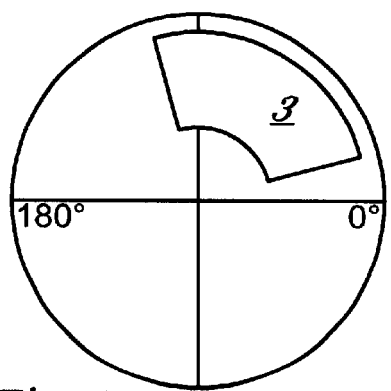
FIG. 13 is an illustration of the range of motion that a preferred embodiment of the invention can impart to a fishing rod during operation of the unit with the housing in the upright position.
Figure 21A:
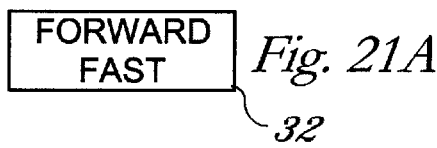
FIGS. 21A through 21D are illustrations of the display panel during the selection of the forward rod movement speed.

Referring to FIGS. 12 and 13, the range of motion that can be imparted to a fishing rod by a preferred embodiment of the invention is illustrated. With housing 6 on its side, the maximum range of motion during vertical operation is 160 degrees as depicted by first arc 1 in FIG. 12. Furthermore, the range of the maximum arc sweep may be any value greater than 0 degrees to a maximum of 160 degrees, not to exceed the range of 180 degrees. The maximum 160-degree arc can occur only within the range limit of 0–180 degrees. For example, the starting position may not be 190 degrees continuing along the arc to 350 degrees as depicted in second arc 2 in FIG. 12.

The maximum range of motion for operation with housing 6 in the upright position, as depicted as third arc 3 in FIG. 13, is 90 degrees within the range limit of 0–180 degrees. For example, as illustrated in FIG. 13, third arc 3 reflects a maximum arc sweep of 90 degrees, starting at 20 degrees and continuing to 110 degrees. The ability to change the beginning position of the rod holder's arc of movement allows for smart rod holder 10 to be used in a broad range of fishing environments. Examples include: (1) starboard and port mounting, (2) transom and bow mounting and (3) jigging mount.

Operation of a preferred embodiment of smart rod holder 10 involves initialization and program operation. Preferably, user selections are made through menu prompts that are displayed on display 32. In a preferred embodiment, keypad 12 has four buttons: a Power button, an Enter button, an Up button and a Down button. In an alternative embodiment, the last two buttons are a Forward button and a Back button. Smart rod holder's menus are circular in that once the user have reach the bottom of the available selections/options, the menu restarts at the first selection/option and continues until 'Enter' has been depressed. Preferably, display 32 is capable of displaying two lines of text with eight characters per line.

Features that are involved in initialization include, but are not limited to, the following:
1. Power-on state
2. Home position
3. Mount position
4. Reverse operation (direction)
5. Rod length
6. Watercraft (boat) speed
7. Rod movement type
8. Stored program selection
9. Backward rod movement speed
10. Forward rod movement speed
11. Maximum forward arc
12. Maximum backward arc
13. Normal back pressure threshold
14. 'Fish On' back pressure threshold Features involved in operation of a preferred embodiment of smart rod holder 10 are as follows:
15. Process program operation
16. Set hook upon 'Fish On' back pressure threshold detection
17. Playing the fish after 'Fish On' detection
18. Audible/light emitting alarm
19. Pause and resume When power is applied to smart rod holder 10, the message shown in FIG. 14 will be displayed and the unit will attempt to move the quick release receptacle to the 'Home' position.

It may be necessary to manually adjust the smart rod holder 10 to the 'Home' position. Once the 'Home' position is correct and the 'Enter' keyboard button is depressed, smart rod holder 10 will continue to use the new position as the reference to 'Home'.

The Home position also changes as smart rod holder 10 is repositioned from on its side to an upright position. With smart rod holder on its side, it is used during starboard and port operation and the upright position is used during transom, bow, or jigging operations. A position-sensing device, such as a mercury switch, is located inside housing 6 of smart rod holder 10. The mercury switch is closed when smart rod holder 10 is on its side and open when smart rod holder 10 is in the upright position, thus allowing the smart rod holder 10 to determine which Home position is to be used: either 90 degrees for vertical operation or 45 degrees for horizontal operation.

The direction of operation of smart rod holder 10 is reversible, that is changing the direction of rod movement is a toggle operation. An example of reverse operation is when smart rod holder 10, which is initially in a vertical position, is moved from the starboard to the port side of a boat. In the starboard position, the front to back motion of the rod holder is left to right, while in the port position the front to back motion of the rod holder is from right to left. The selection of reverse operation determines the direction in which a program is executed. As indicated in FIGS. 15A and 15B, by use of the buttons, the fisherman can select the direction by depressing either the 'Up' or 'Down' button on keypad 12. Panel 32 displays either 'Clockwise' or 'Counter Clock' as the selection is made, and the fisherman may select 'Enter' to accept the currently-displayed movement direction.

The rod length being used by the fisherman is selected using keypad 12 and pressing the 'Enter' button when the appropriate rod length is displayed on panel 32 as shown in FIGS. 16A through 16E. If the selected rod length is different from the default (previously selected) rod length, then the new rod length is stored as the default.

The length of the rod is important when the rod movement pattern is selected as 'by feet.' The number of two-foot movements a ten-foot rod produces over a maximum sweep (arc) of one hundred sixty degrees is greater than the number two-foot movements a six-foot rod will produce over a maximum sweep of one hundred degrees. The length of the rod becomes irrelevant when the rod movement pattern is selected 'by degrees.' In this instance, the default rod length can always be selected to quickly bypass this entry.

In a preferred embodiment, the boat speed options used by smart rod holder 10 range from zero to nine miles per hour (mph), three of which boat speed options are shown in FIGS. 17A through 17C. The boat speed is used by the unit to determine the speed at which the rod movements occur in the backward direction. Smart rod holder 10 moves the rod backward faster for a boat moving nine mph vs. a boat moving three mph. In the program selection section, the backward rod movement may be selected to produce a fast, medium, slow, or program-controlled backward movement.

The actual speed of backward rod movement can be programmed to allow a fishing lure or baited hook to remain under constant tension during the backward movement (slowest setting) or to imitate the motion of an injured or falling fish over a longer period of time (fastest setting). With an increase in the speed of the boat, the backward movement must be increased in order to imitate the motion of an injured or falling fish over a longer period of time. When the boat speed is set to zero mph, smart rod holder 10 is only useable in the horizontal position for jigging.

In a preferred embodiment, smart rod holder 10 includes up to forty stored rod movement programs. Thirty of the rod movement programs are for trolling and ten of the rod movement programs are for jigging.

The first selection is 'Boat Speed' in mph, in the range zero to nine mph. This character is set by the fisherman as described above. The programs stored in smart rod holder 10 use the speed of the boat to make adjustments to the backward and forward rod movement speeds. Although the program patterns remain consistent from one to nine mph, the speed at which the rod movements occur will vary. Therefore, once the speed of the boat is selected the fisherman may only select programs in the selected program group. When zero mph is displayed, the fisherman may only select programs from the jigging program group.

The second selection is the rod movement option (type of rod movement) which can be 'Degrees,' 'Feet,' 'Back pressure' or 'Random' pattern as illustrated in FIGS. 18A through 18D. Each of the following rod movement options contain ten stored programs: (1) 'Degrees,' (2) 'Feet' and (3) 'Back pressure.'

When 'Degrees' is selected, the rod movement through the maximum arc sweep occurs in degree movements, that is, in angular increments measured in degrees. Therefore, the length of the rod is not relevant since a twenty-degree movement is the same for a ten foot or six foot rod.

When 'Feet' is selected, the rod movement through the maximum arc sweep moves the lure a specified number of feet. The selection of 'Feet' requires that the length of the rod be known in order to produce the desired distance of movement.

When 'Back pressure' is selected, the rod movement through the maximum arc sweep moves the lure a specified number of feet very fast to produce the motion of an injured or falling fish. As back pressure on the fishing line reaches the back pressure threshold, smart rod holder 10 tests for the 'Fish On' pressure. If the 'Fish On' back pressure is not present, smart rod holder 10 immediately steps to the next backward movement. When 'Random' is selected, the rod movement through the maximum arc sweep moves through variations of the above rod movement options.

The third selection is the rod movement program. The options are Program 1 through Program 9. These choices are displayed in panel 32 in FIGS. 19A and 19B.

The fourth selection is the speed of backward rod movement as illustrated in FIGS. 20A through 20D. The choices are 'Back Fast,' 'Back Medium,' 'Back Slow' and 'Back Program.' The selection of 'Fast,' 'Medium,' and 'Slow' override the program control speed for backward rod movement. The selection of any option other than 'Back Program' produces a variation on the stored rod movement programs to result in the selected lure movement speed. The 'Back Program' option always produces a lure movement that imitates the motion of an injured or falling fish.

The fifth selection is the speed of forward rod movement as illustrated in FIGS. 21A through 21D. The choices are 'Forward Fast,' 'Forward Medium,' 'Forward Slow' and 'Forward Program.' The selection of 'Fast,' 'Medium,' and 'Slow' override the program control speed for forward rod movement. The selection of any option other than 'Back Program' produces a variation on the stored rod movement programs to result in the selected lure movement speed. The 'Back Program' option always produces a lure movement that imitates the motion of an injured or falling fish.

Figure 22A:
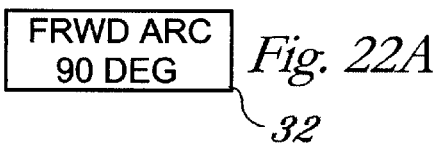
FIGS. 22A and 22B are illustrations of the display panel during the selection of the forward-most rod position.
Figure 22B:

The sixth selection is the range of forward motion. The fisherman may select the forward-most location of rod movement by advancing through increments of ten degrees, starting at ninety degrees and advancing to one hundred eighty degrees, the ends of the range being illustrated in FIGS. 22A and 22B.

Figure 23A:
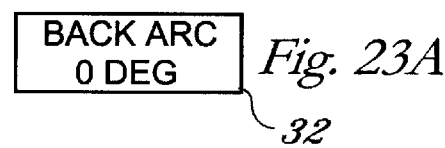
FIGS. 23A and 23B are illustrations of the display panel during the selection of the backward-most rod position.
Figure 21B:
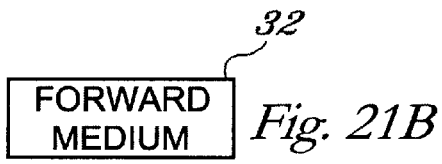
Figure 23B:
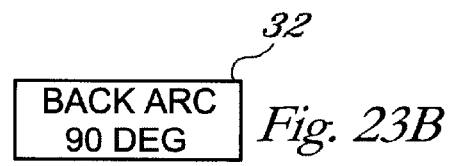
Figure 21C:
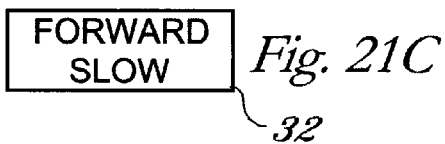

The eighth selection is the range of backward motion. The fisherman may select the backward-most location of rod movement by advancing through increments of ten degrees, starting at ninety degrees and advancing to zero degrees, the ends of the range being illustrated in FIGS. 23A and 23B.

Figure 24:
FIG. 24 is an illustration of the display panel during the determination of the normal back pressure threshold.
Figure 21D:
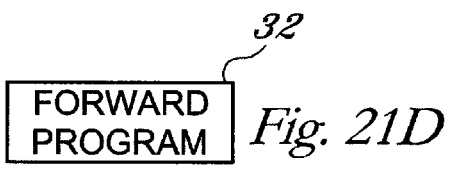

Smart rod holder 10 also allows the fisherman to set the back pressure that it senses during normal operation. The panel displays 'Insert Rod-Enter' as shown in FIG. 24. With the rod placed in the rod holder and the lure already in the water at the desired distance the fisherman presses 'Enter' on keypad 12. Smart rod holder 10 then moves the rod to the forward-most position, at the program's highest forward speed, and reads/sets the trolling back pressure. The motor requires a threshold voltage to be present in order for the motor to move. The highest threshold voltage required by the motor during the movement to the forward most position is considered the normal back pressure threshold. The fisherman/user is allowed to either accept the backpressure setting obtained from testing or adjust it upward or downward.

Smart rod holder 10 also sets the 'Fish On' back pressure threshold. The 'Fish On' back pressure threshold is automatically set to an incremental value higher than the back pressure threshold in the previous initialization step.

In a preferred embodiment, after the initialization process is completed, programmed operation of smart rod holder 10 begins. The normal back pressure and 'Fish On' back pressure thresholds must have been read and set for the unit to begin execution of the program statements.

One of the capabilities of a preferred embodiment of smart rod holder 10 is to set the hook upon detection of a back pressure that is equal to or greater than the 'Fish On' back pressure threshold. While smart rod holder 10 is executing rod movement commands, it tests for both the normal back pressure threshold and 'Fish On' back pressure threshold at the beginning of each movement command. The testing operation requires a slight movement forward (under pressure) to test for these conditions. If the 'Fish On' back pressure threshold is detected, smart rod holder moves the fishing rod very rapidly approximately thirty degrees in the forward direction or to the maximum arc sweep position, whichever is less. This quick forward movement is the 'Set Hook' operation. Assuming the drag is set appropriately on the fishing rod, the amount of back pressure does not exceed the force necessary to rotate the motor backward and cause it to lose position information.

Another capability of a preferred embodiment of smart rod holder 10 is playing the fish after the 'Fish On' back pressure is detected. While the 'Fish On' back pressure is detected, smart rod holder 10 maintains the 'Fish On' back pressure, in essence playing the hooked fish, by moving the fishing rod forward or backward in incremental motor movements until either the maximum forward or backward position is reached. If the sensed back pressure falls below the 'Fish On' back pressure, smart rod holder 10 moves the fishing rod quickly toward the maximum forward position. If the 'Fish On' back pressure is encountered during rod movement toward the maximum forward position, the program resumes playing the fish or stops at the forward most position.

Yet another capability of smart rod holder 10 is emitting an audible/light alarm. During the time that the 'Fish On' back pressure is sensed, an audible/light alarm is emitted.

A further capability of a preferred embodiment of smart rod holder 10 is the capability to pause and resume operation. At any point in a program's operation, the 'Enter' button may be pressed to pause the program. Pressing the 'Enter' button again causes the program to resume at the point where pause occurred. For example, the fisherman would normally press 'Enter'button before removing quick-release rod receptacle 37 from the unit.

In summary, in a preferred embodiment, after initialization; setting the Home position, setting the Direction of operation, and setting of the Rod Length, the program selection process begins.

The first selection is the specification for Boat Speed in mph, in the range zero to nine mph. The programs stored in the smart rod holder use the speed of the boat to make adjustments to the backward and forward rod movement speeds. Although the program patterns remain consistent from one to nine mph, the speed at which the rod movements occur will vary. Therefore, once the speed of the boat is selected the fisherman may only select programs in the selected program group. When zero mph is displayed, the fisherman may only select programs from the jigging program group.

The second selection is the Rod Movement option which can be 'Degrees,' 'Feet,' 'Backpres' or a 'Random' pattern. Each of the following rod movement options contain ten stored programs: (1) 'Degrees,' (2) 'Feet' and (3) 'Back pressure.'

When 'Degrees' is selected, the rod movement through the maximum arc sweep occurs in degree movements. Therefore, the length of the rod is not relevant since a twenty degree movement is the same for a ten foot or six foot rod.

When 'Feet' is selected, the rod movement through the maximum arc sweep moves the lure a specified number of feet. The selection of 'Feet' requires that the length of the rod be known in order to produce the desired distance of movement.

When 'Back pressure' is selected, the rod movement through the maximum arc sweep moves the lure a specified number of feet very fast to produce the motion of an injured or falling fish.

The third selection is the program selection option. The choices are 'Program 1' through 'Program 9.' The fisherman selects the stored program that produces the rod movements he most desires.

The fourth selection is the speed of backward rod movement. The choices are 'Fast,' 'Medium,' 'Slow,' and 'Program.' The selection of 'Fast,' 'Medium,' and 'Slow,' override the program control speed for backward rod movement. The selection of any option other than 'Program' produces a variation on the stored rod movement programs that results in the selected lure movement speed. The 'Program' option always produces a lure movement that imitates the motion of an injured or falling fish.

The fifth selection is the speed of forward rod movement. The choices are 'Fast,' 'Medium,' 'Slow,' and 'Program.' The selection of 'Fast,' 'Medium,' or 'Slow,' override the program control speed for forward rod movement. The selection of any option other than 'Program Controlled' produces a variation on the stored rod movement programs that results in the selected lure movement speed.

During operation, as back pressure on the fishing line reaches the back pressure threshold, smart rod holder 10 tests for the 'Fish On' pressure. If the 'Fish On' back pressure is not present, smart rod holder 10 immediately steps to the next backward movement. When 'Random' is selected, the rod movement through the maximum arc sweep moves through variations of the above rod movement options.

In a preferred embodiment, smart rod holder 10 is programmed to accept commands from a user (e.g., fisherman), to accept sensor inputs and to control the operation of the unit. FIGS. 25A through 25G present portions of a schematic flowchart that illustrate preferred program steps.

Figure 25A:
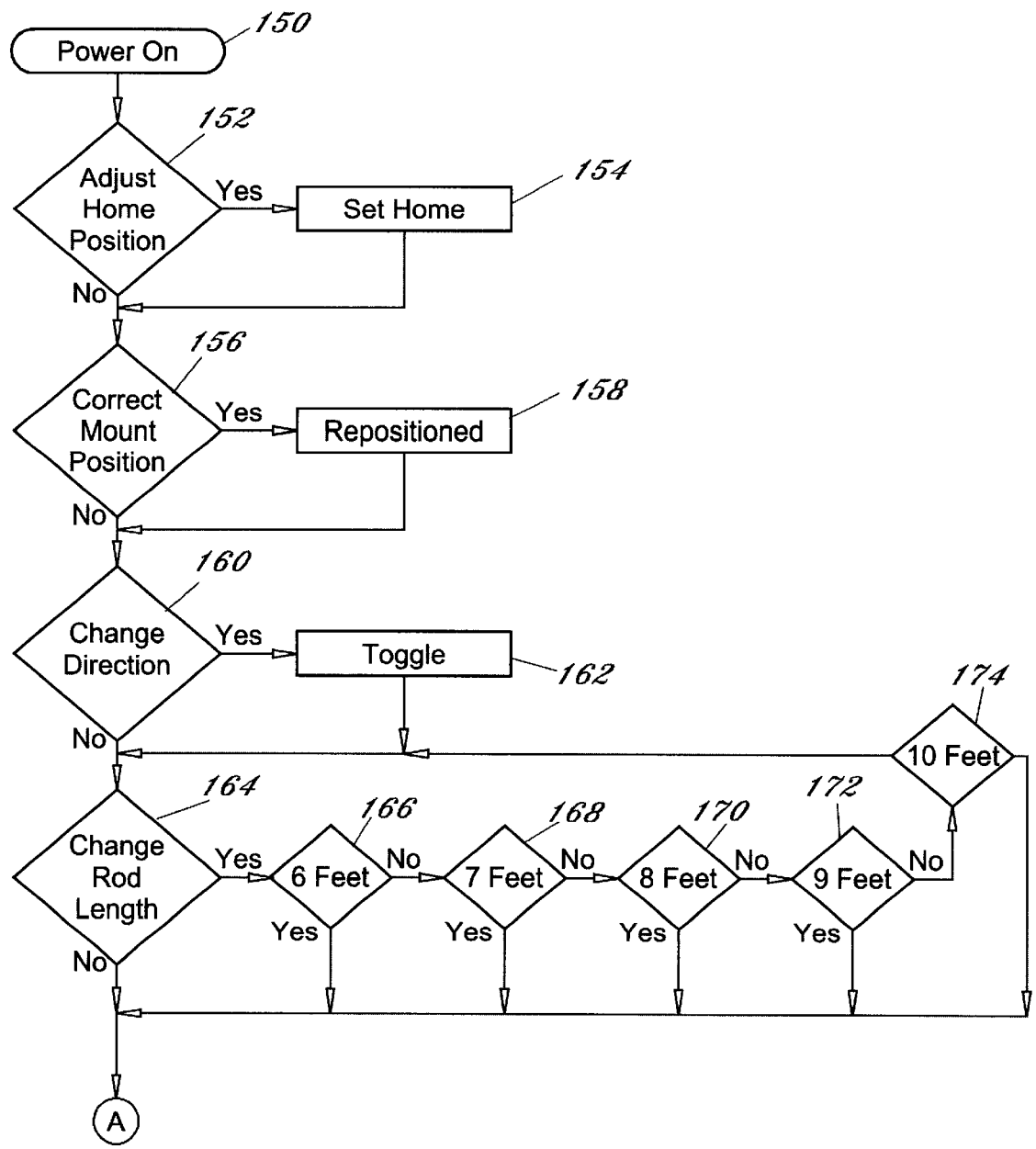
FIGS. 25A through 25G are portions of a schematic flowchart that illustrates preferred steps involved in operation of the unit.

Referring to FIG. 25A, a flowchart illustrates preferred steps that are involved in initialization of the unit. Execution of the program begins at Power On step 150 at which time smart rod holder 10 attempts to move the rod to the home position. At Adjust Home Position step 152, the fisherman decides whether it is necessary to adjust the home position. If adjustment is necessary, Set Home step 154 is executed which involves the fisherman using the 'Up' or 'Down' keyboard button and then pressing the 'Enter' button.

At Correct Mount Position step 156, the fisherman decides whether the unit is in one of the two allowed positions of operation. If it is not, the unit is repositioned to either the vertical position or the horizontal position in Repositioned step 158.

At Change Direction step 160, the fisherman decides whether the direction of operation should be changed. If change from clockwise to counterclockwise operation or change from counterclockwise to clockwise operation is necessary, Toggle step 162 is executed which involves the fisherman's using the 'Up' or 'Down' keyboard button and then pressing the 'Enter' button.

At Change Rod Length step 164, the fisherman decides whether the default rod length or another rod length that is stored in the unit's memory should be used in other program steps. If a change in rod length is necessary, Set Length steps 166 through 174 are executed which involves the fisherman's using the 'Up' or 'Down' keyboard button to make a selection for rod length and then pressing the 'Enter' button.

Figure 25B:
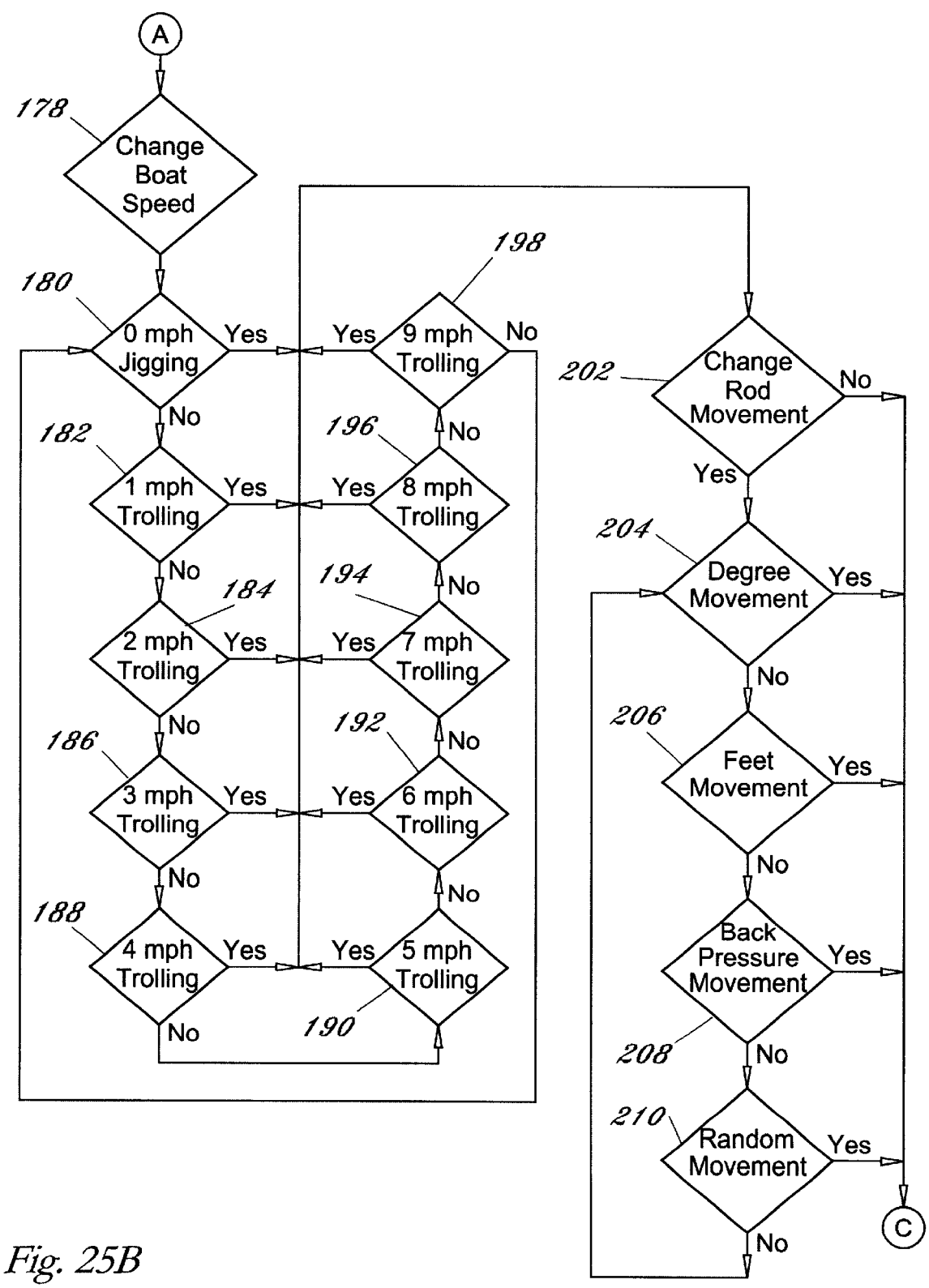

Referring to FIG. 25B, at Change Boat Speed step 178, the fisherman decides whether the boat speed that is stored in the unit's memory should be used in other program steps. If a change in boat speed is necessary, Set Speed steps 180 through 198 are executed which involves the fisherman's using the 'Up' or 'Down' keyboard button to make a selection and then pressing the 'Enter' button.

At Change Rod Movement step 202, the fisherman decides whether the rod movement stored in the unit's memory should be used in other program steps. If a change in the rod movement is necessary, Rod Movement steps 206 through 210, which allows the selection of 'Degrees,' 'Feet,' 'Back Pressure' or 'Random', are executed. The fisherman uses the 'Up' or 'Down' keyboard button to advance through the options and presses the 'Enter' button to make a selection.

An example of a stored program is as follows: five quick, separate, ten-degree movements forward, a quick one-hundred-forty-degree move to the rear and a quick ninety-degree move forward to the starting position. In this example, the starting point is ninety degrees from the side of the boat. The first five forward movements are designed to cause the lure or bait to mimic a fish swimming in a darting motion. The large, quick one-hundred-forty-degree movement to the rear causes the lure or bait to stop moving momentarily, which creates the illusion of an injured or dying fish. The ninety-degree forward movement appears to be an escape motion. Such programmed rod movements produce much more lifelike lure motions. In a preferred embodiment, a plurality of stored programs can be chained together.

Figure 25C:
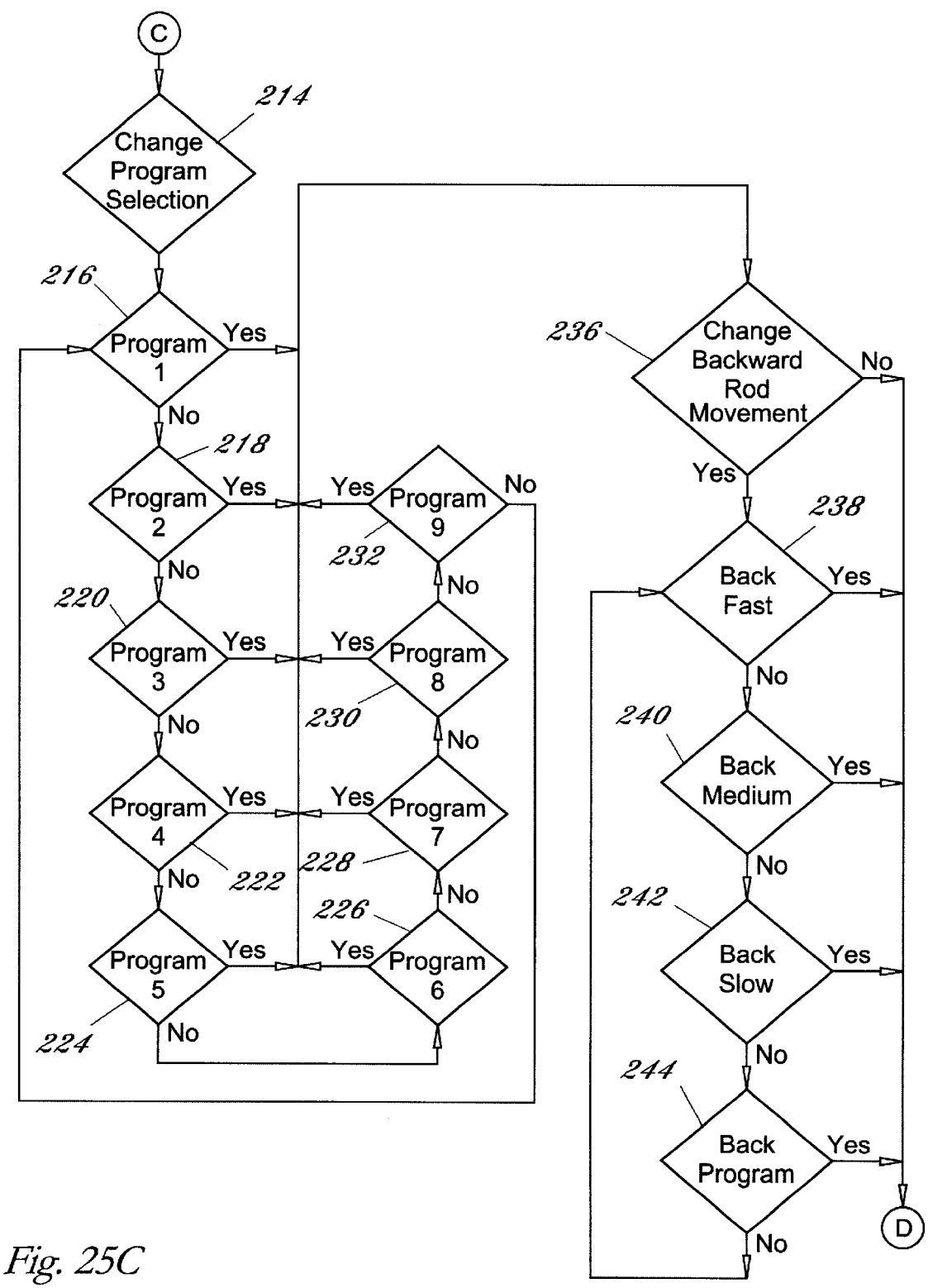

Referring to FIG. 25C, at Change Program Selection step 214, the fisherman decides whether the program stored in the unit's memory should be used. If a change in the program is necessary, Program Selection steps 216 through 232, which allow one selection from programs one through nine, are executed. The fisherman uses the 'Up' or 'Down' keyboard button to advance through the options and presses the 'Enter' button to make a selection.

At Change Backward Rod Movement step 236, the fisherman decides whether the backward rod movement stored in the unit's memory should be used. If a change in the program is necessary, Back Rod Movement steps 238 through 244 are executed. In this process, the fisherman is presented with choices for the backward rod movement speed. The selection options are 'Fast,' 'Medium,' 'Slow' or 'Program Controlled.' The backward rod movement speed is selected by the fisherman by pressing the 'Up' or 'Down' keyboard button and by pressing the 'Enter' button to make the selection.

Figure 25D:
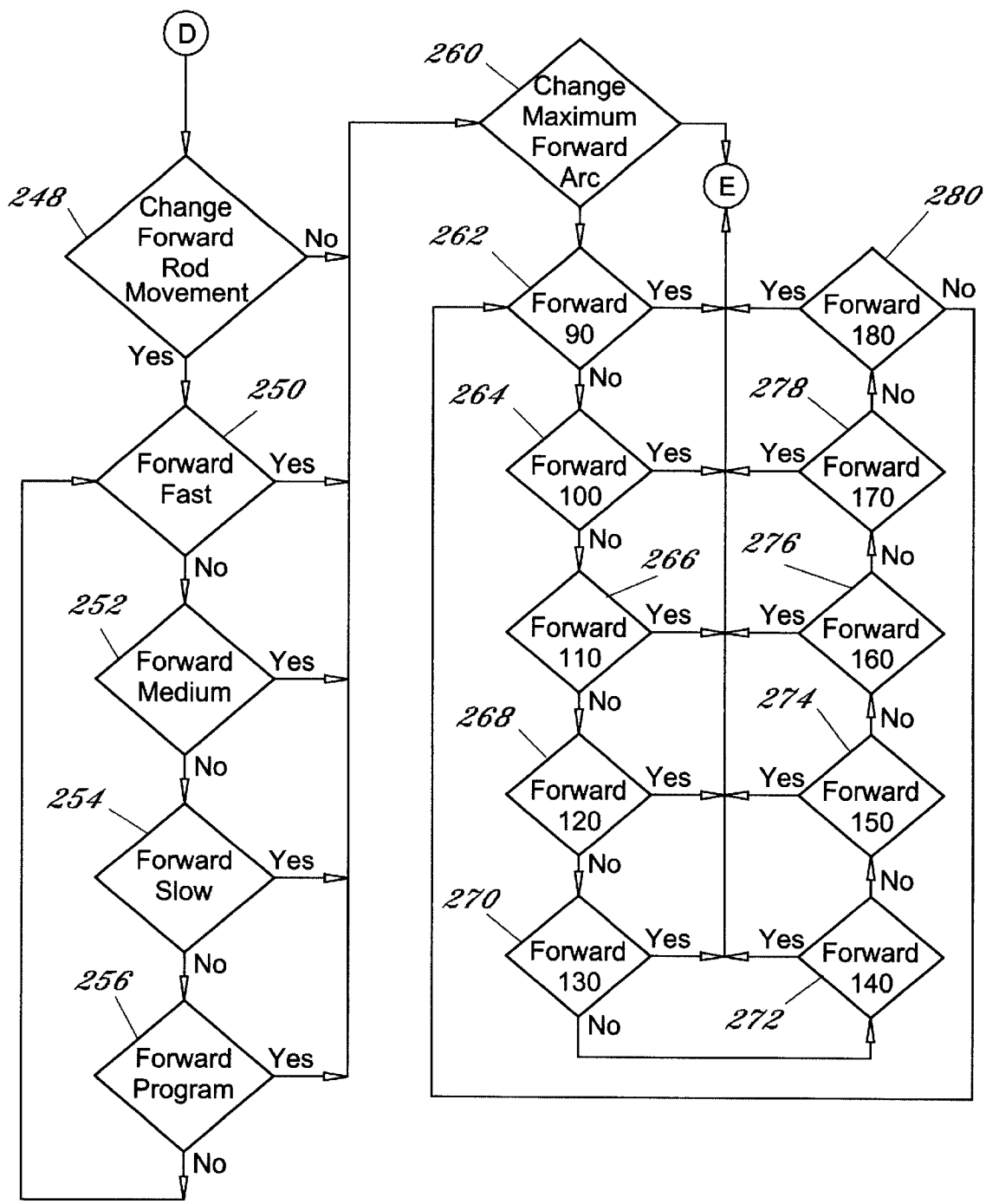

Referring to FIG. 25D, at Change Forward Rod Movement step 248, the fisherman decides whether the forward rod movement stored in the unit's memory should be used. If a change in the program is necessary, Forward Rod Movement steps 250 through 256 are executed. In this process, the fisherman is presented with choices for the forward rod movement speed. The selection options are 'Fast,' 'Medium,' 'Slow' or 'Program Controlled.' The forward rod movement speed is selected by the fisherman by pressing the 'Up' or 'Down' keyboard button and by pressing the 'Enter' button to make the selection.

At Change Maximum Forward Arc step 260, the fisherman decides whether the maximum forward arc stored in the unit's memory should be used. If a change in the program is necessary, Maximum Forward Arc steps 262 through 272 are executed. In this process the fisherman is presented with choices for the Maximum Forward Arc, measured in degrees. The selection options are 'Forward Ninety,' 'Forward One Hundred,' 'Forward One Hundred Ten,' 'Forward One Hundred Twenty,' 'Forward One Hundred Thirty,' 'Forward One Hundred Forty,' 'Forward One Hundred Fifty,' 'Forward One Hundred Sixty,' 'Forward One Hundred Seventy,' and 'Forward One Hundred Eighty.' The maximum forward arc is selected by the fisherman by pressing the 'Up' or 'Down' keyboard button and by pressing the 'Enter' button to make the selection.

Figure 25E:
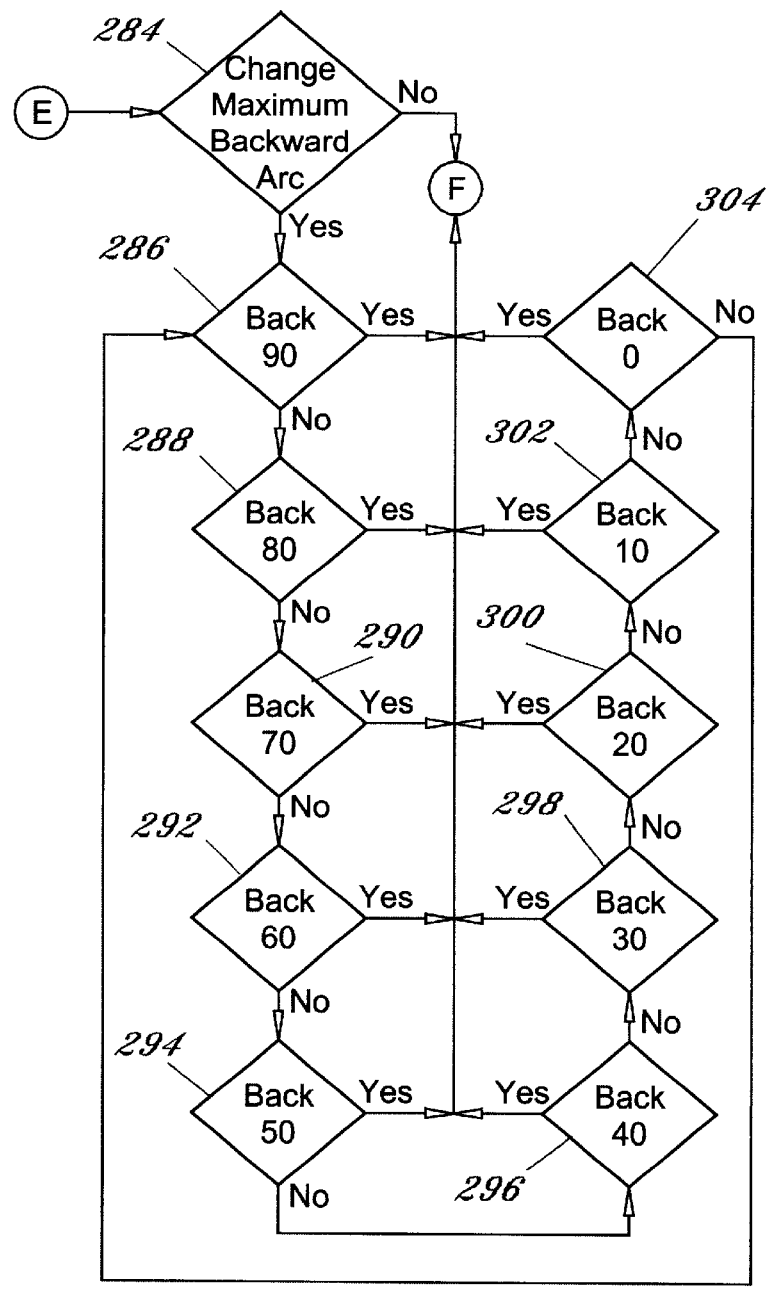
Figure 25F:
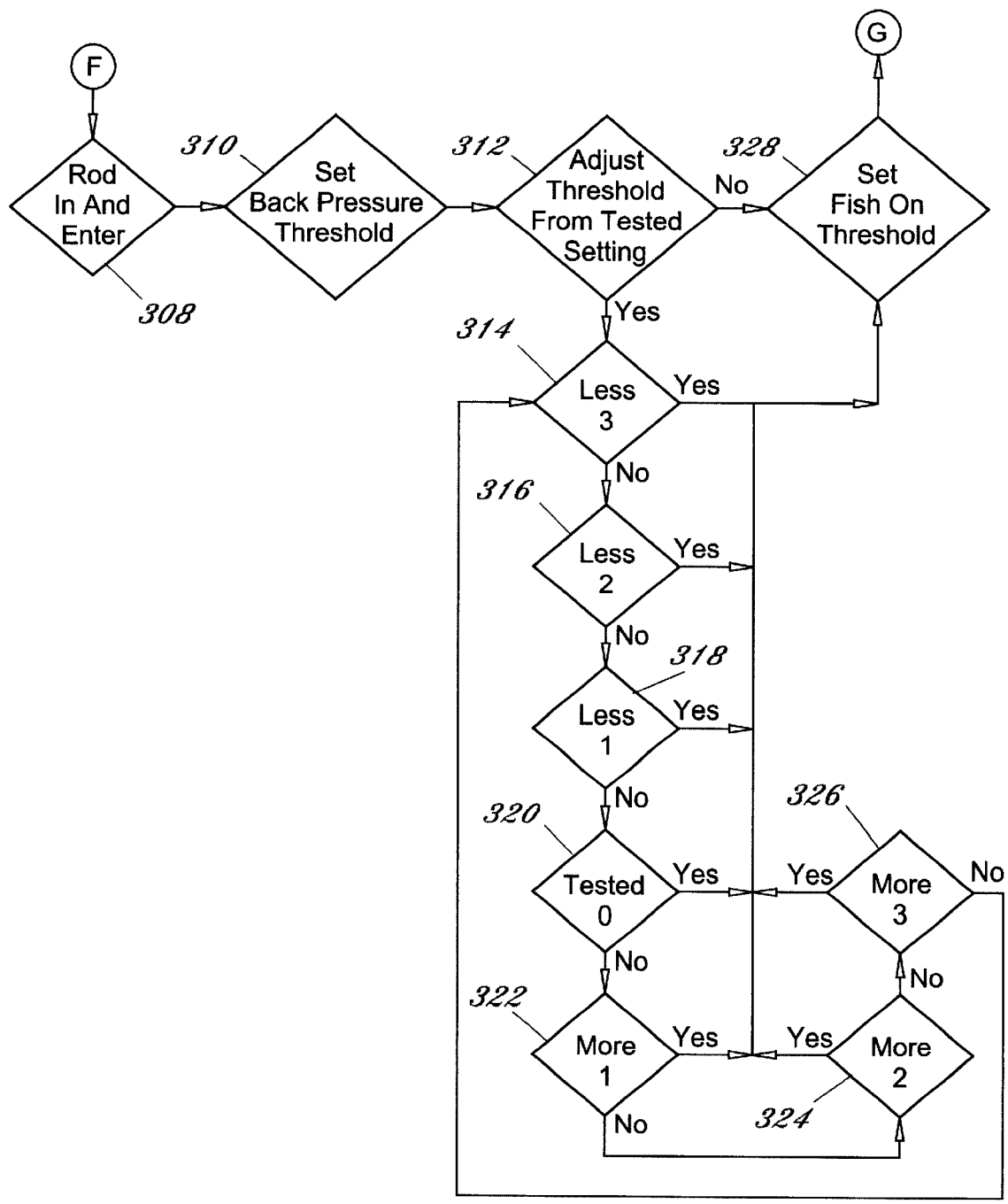

Referring to FIG. 25E, at Change Maximum Backward Arc step 284, the fisherman decides whether the maximum backward arc stored in the unit's memory should be used. If a change in the program is necessary, Maximum Backward Arc steps 286 through 304 are executed. In this process the fisherman is presented with choices for the Maximum Backward Arc, measured in degrees. The selection options are 'Backward Ninety,' 'Backward Eighty,' 'Backward Seventy' 'Backward Sixty' 'Backward Fifty' 'Backward Forty,' 'Backward Thirty,' 'Backward Twenty' 'Backward Ten,' and 'Backward Zero.' The maximum backward arc is selected by the fisherman by pressing the 'Up' or 'Down' keyboard button and by pressing the 'Enter' button to make the selection Referring to FIG. 25F, smart rod holder 10 also allows the fisherman to set the back pressure that it senses during normal operation. At Rod In and Enter step 308, the panel displays 'Insert Rod-Enter' as shown in FIG. 24. With the rod placed in the rod holder and the lure already in the water at the desired distance the fisherman presses 'Enter' on keypad 12. Smart rod holder 10 then moves the rod to the forward-most position, at the program's highest forward speed, and reads/sets the trolling back pressure at Set Back Pressure Threshold step 310. The motor requires a threshold voltage to be present in order for the motor to move. The highest threshold voltage required by the motor during the movement to the forward most position is considered the normal back pressure threshold. The fisherman/user is allowed to either accept at the backpressure setting obtained from testing Adjust Threshold from Setting Step 312 or adjust it upward or downward at Threshold steps 314 through 326. The adjustment is selected by the fisherman by pressing the 'Up' or 'Down' keyboard button and by pressing the 'Enter' button to make the selection Smart rod holder 10 also sets the 'Fish On' back pressure threshold at Set Fish On Threshold step 328. The 'Fish On' back pressure threshold is automatically set to an incremental value higher than the back pressure threshold set in the previous initialization step.

Figure 25G:
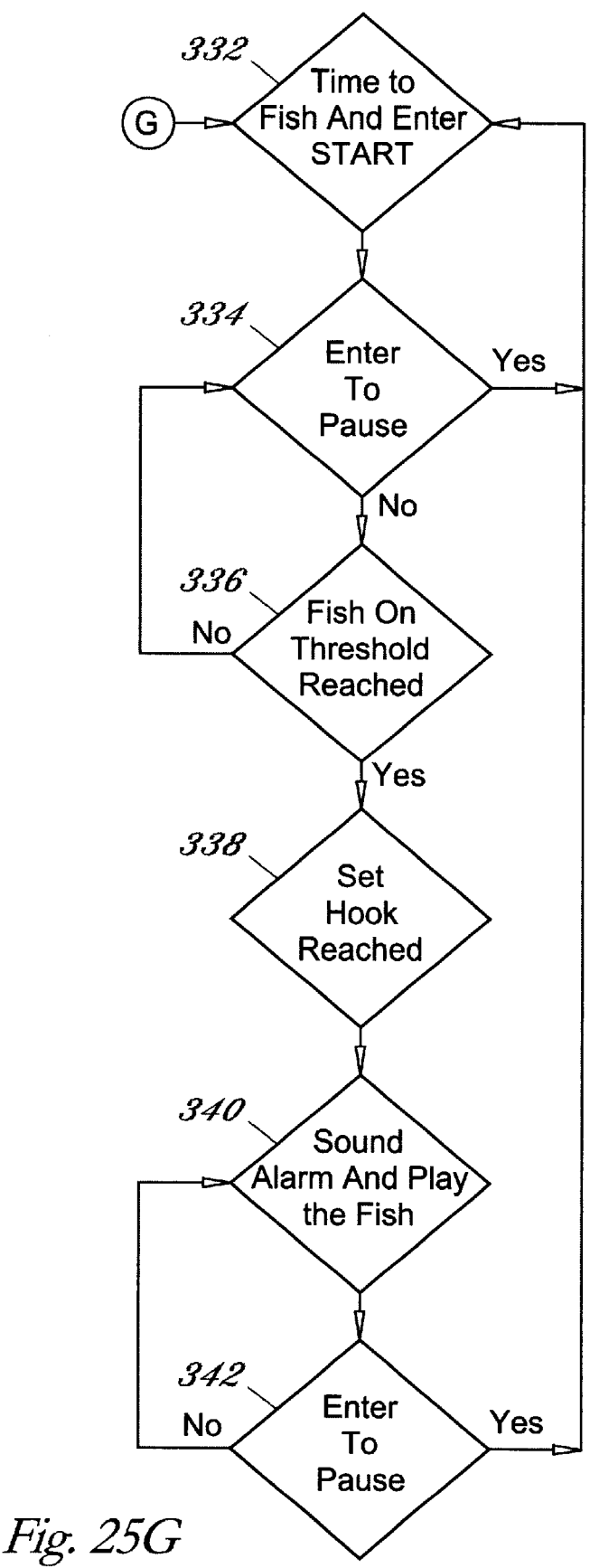

Referring to FIG. 25G, in a preferred embodiment, after the initialization process is completed, programmed operation of smart rod holder 10 begins at Time to Fish and Enter Start step 332. The normal back pressure and 'Fish On' back pressure thresholds must have been read and set for the unit to begin execution of the program statements. At Enter to Pause Before step 334, the 'Enter' button may be pressed to pause the program.

Smart rod holder 10 will set the hook upon detection of a back pressure that is equal to or greater than the 'Fish On' back pressure threshold. While smart rod holder 10 is executing rod movement commands, it tests for both the normal back pressure threshold and 'Fish On' back pressure threshold at the beginning of each movement command. The testing operation requires a slight movement forward (under pressure) to test for these conditions. If the 'Fish On' back pressure threshold is detected at Fish On Threshold Reached step 336, smart rod holder moves the fishing rod very rapidly approximately thirty degrees in the forward direction or to the maximum arc sweep position, whichever is less, at Set Hook step 338. This quick forward movement is the 'Set Hook' operation. Assuming the drag is set appropriately on the fishing rod, the amount of back pressure does not exceed the force necessary to rotate the motor backward and cause it to lose position information.

Smart rod holder 10 also plays the fish after the 'Fish On' back pressure is detected at Sound Alarm and Play the Fish step 340. While the 'Fish On' back pressure is detected, smart rod holder 10 maintains the 'Fish On' back pressure, in essence playing the hooked fish, by moving the fishing rod forward or backward in incremental motor movements until either the maximum forward or backward position is reached. If the sensed back pressure falls below the 'Fish On' back pressure, smart rod holder 10 moves the fishing rod quickly toward the maximum forward position. If the 'Fish On' back pressure is encountered during rod movement toward the maximum forward position, the program resumes playing the fish or stops at the forward most position. During the time that the 'Fish On' back pressure is sensed, an audible/light alarm is emitted.

During execution of Sound Alarm and Play the Fish step 340, the 'Enter' button may be pressed to pause the program at Enter to Pause After step 342. Pressing the 'Enter' button again causes the program to resume at the point where pause occurred. For example, the fisherman would normally press 'Enter' button after the alarm had sounded and before removing quick-release rod receptacle 37 from the unit.

Many variations of the invention will occur to those skilled in the art. Some variations include features needed for jigging. Other variations include features needed for trolling. All such variations are intended to be within the scope and spirit of the invention.

I claim:

1. A holder for a fishing rod or pole, said fishing rod or pole having a reel and a tip, said rod holder comprising:
    means for receiving the end of said fishing rod adjacent said reel;
    means for driving the movement of said means for receiving;
    means for connecting said means for receiving to said means for driving;
    means for controlling said means for driving, said means for controlling comprising a memory and a processor, said processor being programmed to execute a software program that is resident in said memory that is operative to generate a control signal in response to a selection by a user; and
    means for attaching said means for driving to a watercraft or a stationary body.

2. A holder for a fishing rod or pole, said fishing rod or pole having a reel and a tip, said rod holder comprising:
    a quick-release receptacle;
    a drive mechanism;
    a rod connection mechanism connecting said quick-release receptacle to said drive mechanism;
    a programmable controller for said drive mechanism, said programmable controller comprising a memory, and a processor, said processor being programmed to execute a software program that is resident in said memory that is operative to generate a control signal in response to a selection by a user, and
    a mounting bracket for attaching said drive mechanism to a watercraft or a stationary body.

3. The holder of claim 2 further comprising a housing for containing said drive mechanism and said programmable controller.

4. The holder of claim 3 the mounting bracket is adaptable to support the housing on its side and in an upright position.

5. The holder of claim 2 wherein said rod connection mechanism is configured as an elbow with a female connector at a first end that connects to the drive shaft and an annular groove and a female collar at a second end, said annular groove and said female collar being configured to allow attachment of the rod connection mechanism to the quick-release receptacle.

6. The holder of claim 2 wherein said quick-release receptacle comprises:
    a rod-receiving member having a female portion having a mouth and a male portion;
    a diameter reduction member that is operative to reduce the diameter of said mouth when rotated relative to said female portion;
    and a lever member that is operative to hold said rod-receiving member to and to release said rod-receiving member from said rod connection mechanism.

7. The holder of claim 6 wherein the rod connection mechanism has a female collar, the male portion has a shoulder containing recesses and a central cylindrical member that is configured to be insertable in the female collar and the female portion is configured to provide a cavity having a mouth for receiving the reel end of the fishing rod or pole.

8. The holder of claim 2 wherein said drive mechanism comprises:
    a motor;
    a torque increase gear and drive shaft connected to said motor; and
    a position-sensing switch capable of sensing the position of said
    drive shaft.

9. The holder of claim 8 wherein the motor is a direct-current motor and said torque increase gear and drive shaft has an enclosed worm and a torque increase gear.

10. The holder of claim 2 wherein said programmable controller is capable of causing said quick-release receptacle and said rod tip to move left to right, right to left, up to down and down to up at a plurality of user-selected distances, speeds and time intervals.

11. The holder of claim 2 wherein said programmable controller is programmable by means of an input device and an output device.

12. The holder of claim 2 wherein said programmable controller is programmed with a program to cause the tip of the rod to rise and set a hook in a fish's mouth when the program detects an increase in line pressure that is above the threshold set during an initiation step.

13. An apparatus for fishing comprising
    a smart rod holder operated in accordance with the method of claim 1;
    wherein said smart rod holder comprises:
        a quick-release receptacle;
        a drive mechanism having a drive shaft;
        a rod connection mechanism connecting said quick-release receptacle to said drive mechanism;
        a programmable controller for said drive mechanism, said programmable controller comprising a memory and a processor, said processor being programmed to execute a software program that is resident in said memory that is operative to generate a control signal in response to a selection by a user; and
        a mounting bracket for attaching said drive mechanism to a watercraft or a stationary body.

14. A rod holder comprising:
a receptacle for a fishing rod;
a windshield wiper motor mechanism having a drive shaft that is attached to said receptacle; and
a programmable controller for controlling the operation of said windshield wiper motor, said programmable controller comprising a memory and a processor, said processor being programmed to execute a software program that is resident in said memory.

15. A holder for a fishing rod or pole, said fishing rod or pole having a reel and a tip, said rod holder comprising:
a quick-release receptacle for receiving the end of said fishing rod adjacent said reel;
a drive mechanism having a drive shaft;
a rod connection mechanism connecting said quick-release receptacle to said drive mechanism;
a programmable controller for said drive mechanism, said programmable controller comprising a memory and a processor, said processor being programmed to execute a software program that is resident in said memory that is operative to generate a control signal in response to a selection by a user; and
a mounting bracket for attaching said drive mechanism to a watercraft or a stationary body.

16. A rod holder for a fishing rod or pole, said fishing rod or pole having a reel and a tip, said rod holder comprising:
a quick-release receptacle for receiving the end of said fishing rod adjacent said reel;
a drive mechanism having a drive shaft;
a rod connection mechanism connecting said quick-release receptacle to said drive mechanism;
a programmable controller for said drive mechanism, said programmable controller comprising a memory and a processor, said processor being programmed to execute a software program that is resident in said memory that is operative to generate a control signal in response to a selection by a user; and
a mounting bracket for attaching said drive mechanism to a watercraft or a stationary body;
wherein said drive mechanism is operative to move said rod connection mechanism in a plurality of partial revolutions in response to said control signal, which causes said quick-release receptacle to move which moves said tip in a plurality of motions, said plurality of motions comprising a non-oscillatory motion.

17. The holder of claim 16 further comprising a housing for containing said drive mechanism and said programmable controller; and wherein said drive shaft terminates in said rod connection mechanism.

18. The holder of claim 17 wherein the mounting bracket is hinged and is operative to support the housing on its side and in an upright position.

19. The holder of claim 16 wherein said rod connection mechanism is configured as an elbow with a female connector at a first end that connects to an end of the drive shaft and an annular groove and a female collar at a second end, said annular groove and said female collar being configured to allow attachment of the rod connection mechanism to the quick-release receptacle.

20. The holder of claim 16 wherein said programmable controller is programmable by means of an input device and an output device, said output device comprising a display.

21. The holder of claim 16 wherein said programmable controller is operative to cause the tip of the rod to rise and set a hook in a fish's mouth when the program detects an increase in line pressure that is above the threshold set during an initiation step.

22. A holder for a fishing rod or pole, said fishing rod or pole having a reel and a tip, said holder comprising:
a quick-release receptacle for receiving the end of said fishing rod adjacent said reel, said quick-release receptacle having a male portion and a female portion;
a drive mechanism having a drive shaft;
a rod connection mechanism connecting said quick-release receptacle to said drive mechanism;
a programmable controller for said drive mechanism, said programmable controller being programmed to generate a control signal in response to a selection by a user;
a mounting bracket for attaching said drive mechanism to a watercraft or a stationary body;
wherein said drive mechanism moves said rod connection mechanism in a partial revolution in response to said control signal, which causes said quick-release receptacle to move which moves said tip; and
means for inputting the speed of said watercraft and for transmitting a speed signal to said programmable controller which speed signal is used by said programmable controller in determining the magnitude of said partial revolution.

23. A fishing system comprising:
a watercraft having the rod holder of claim 2 attached to it.

24. An apparatus for fishing with a rod that has a reel or handle at a first end and a tip at a second end comprising:
the rod holder of claim 15;
means for attaching a lure or baited hook to a line that is attached to said rod at or through said tip and placing said lure or baited hook in water having a fish;
means for securing said first end of said rod in said rod holder;
means a inputting a selection to the software program resident in said programmable controller that causes said rod holder to move said tip in a selected motion; and
means for executing said software program to make said rod holder capable of detecting a bite by said fish, setting the hook in the mouth of said fish, and playing said fish.

25. The apparatus of claim 24 further comprising:
means for detecting a nibble before a bite has occurred; and
means for moving said tip in a direction that causes said lure or baited hook to pause or move more slowly in said water than it had been moving before the nibble was detected.

26. A method of fishing implemented by a computer-controlled fishing rod holder, said method comprising:
a fisherman's inserting a fishing rod in the rod holder of claim 2; and
said rod holder moving the fishing rod in a type of rod movement selected from the group consisting of:
degree movement,
feet movement,
back pressure movement, and
random movement.

27. A method of operating a rod holder, said method comprising:
attaching the rod holder of claim 16 to a watercraft or stationary object;

moving said receptacle holding a fishing rod in accordance with a sequence of instructions that accepts user input as to a type of rod movement option, a program selection option, and a speed of rod movement option; and testing for a selected fish-on pressure.

28. A method of fishing with a rod that has a reel or handle at first end and a tip at second end comprising:

a step for attaching the rod holder of claim 15 to a watercraft or stationary object;

a step for attaching a lure or baited hook to a line that is attached to said rod at or through said tip and placing said lure or baited hook in water having a fish;

a step for securing said first end of said rod in said rod holder;

a step for selecting a software program resident in said programmable controller that causes said rod holder to move said tip in a selected motion.

29. A method of fishing with a rod that has a reel or handle at a first end and a tip at a second end comprising the steps of:

attaching the rod holder of claim 15 to a watercraft or stationary object;

attaching a lure or baited hook to a line that is attached to said rod at or through said tip and placing said lure or baited hook in water having a fish;

securing said first end of said rod in said rod holder;

selecting a software program resident in said programmable controller that causes said rod holder to move said tip in a selected motion;

executing said software program to make said rod holder capable of detecting a bite by said fish, setting the hook in the mouth of said fish, and playing said fish; and removing said rod from said rod holder and retrieving the hooked fish.

30. A process of operating a fishing system, said fishing system comprising a watercraft, a fishing rod and a rod holder comprising a programmable controller, said process comprising:

attaching the rod holder of claim 14 to said watercraft or a stationary object;

a fisherman's inserting said fishing rod in said rod holder and interacting with said programmable controller, said interacting comprising:

adjusting said small rod holder to a home position, setting a direction of operation, selecting a rod length option, selecting a watercraft speed option, selecting a rod movement option, selecting a software program option, selecting a speed of backward rod movement option; and selecting a speed of forward rod movement option.

31. The process of claim 30 further comprising;

inputting a software program option.

* * * * *